United States Patent
Ito et al.

(10) Patent No.: US 8,119,054 B2
(45) Date of Patent: Feb. 21, 2012

(54) METHOD AND APPARATUS FOR MANUFACTURING A MOLDED PRODUCT

(75) Inventors: Hiroshi Ito, Hiroshima (JP); Kazutoshi Yakemoto, Hiroshima (JP)

(73) Assignee: Japan Steel Works, Ltd., Tokyo (JP)

( * ) Notice: Subject to any disclaimer, the term of this patent is extended or adjusted under 35 U.S.C. 154(b) by 155 days.

(21) Appl. No.: 11/660,555

(22) PCT Filed: Aug. 19, 2005

(86) PCT No.: PCT/JP2005/015145
§ 371 (c)(1),
(2), (4) Date: Feb. 20, 2007

(87) PCT Pub. No.: WO2006/019160
PCT Pub. Date: Feb. 23, 2006

(65) Prior Publication Data
US 2008/0093764 A1    Apr. 24, 2008

(30) Foreign Application Priority Data
Aug. 19, 2004    (JP) ................................. 2004-239567

(51) Int. Cl.
*B27N 3/08*    (2006.01)
(52) U.S. Cl. ........ 264/319; 264/102; 264/240; 264/250; 264/255; 264/318; 264/464; 264/496; 264/531; 264/534; 264/539; 264/540; 264/542; 264/553; 264/554; 239/751; 239/225.1; 141/352; 222/526; 222/251; 198/641; 414/174; 414/193
(58) Field of Classification Search ................... 264/319, 264/250, 255, 318, 102, 240, 464, 496, 531, 264/534, 539, 540, 542, 553, 554, 69, 320, 264/323, 308, 297.8, 245, 293, 132, 310, 264/259, 279, 138; 239/751, 225.1; 141/352; 222/526, 251; 198/641; 414/174, 193
See application file for complete search history.

(56) References Cited

U.S. PATENT DOCUMENTS
4,967,933 A * 11/1990 Maiorca et al. ................... 222/1
(Continued)

FOREIGN PATENT DOCUMENTS
JP    49-81962    7/1974
(Continued)

OTHER PUBLICATIONS
CJP, "SMMA Acrylic Styrene Copolymer", http://www.cjpsales.co.uk/products/downloads/22.pdf, p. 1.*
(Continued)

*Primary Examiner* — Katarzyna Wyrozebski Lee
*Assistant Examiner* — Joshel Rivera
(74) *Attorney, Agent, or Firm* — Sughrue Mion, PLLC

(57) ABSTRACT

A method and apparatus for manufacturing a molded product that includes a resin coating step of coating molten resin onto a forming mold having a minute uneven portion on the surface thereof, a compressing step of pressing the molten resin using the forming mold to thereby arrange the shape of the molded product, and a solidifying step of cooling and solidifying the molten resin. The resin coating step supplies the molten resin to a resin coating device including a discharge port and, while moving the resin coating device, discharges the molten resin onto the minute uneven portion of the heated forming mold from above to fill the molten resin into the minute uneven portion substantially in the same shape and thickness as those of a final shape of the molded product.

46 Claims, 16 Drawing Sheets

U.S. PATENT DOCUMENTS

| | | | |
|---|---|---|---|
| RE35,534 E * | 6/1997 | Claytor ..................... | 359/742 |
| 6,101,031 A * | 8/2000 | Yoshimura et al. ........... | 359/456 |
| 6,645,793 B2 * | 11/2003 | Fujii et al. ................. | 438/127 |
| 2002/0093122 A1 | 7/2002 | Choi et al. | |
| 2002/0130427 A1 | 9/2002 | Kobayashi | |
| 2003/0127765 A1 * | 7/2003 | Weiland et al. ............. | 264/69 |
| 2004/0150129 A1 | 8/2004 | Hougham | |

FOREIGN PATENT DOCUMENTS

| | | | |
|---|---|---|---|
| JP | 60-201911 A | 10/1985 | |
| JP | 61-47609 U | 3/1986 | |
| JP | 61-137726 A | 6/1986 | |
| JP | 61-137726 U | 6/1986 | |
| JP | 01-150515 A | 6/1989 | |
| JP | 01-286390 A | 11/1989 | |
| JP | 5-077268 A | 3/1993 | |
| JP | 06-000830 A | 1/1994 | |
| JP | 6-114860 A | 4/1994 | |
| JP | 08-207159 A | 8/1996 | |
| JP | 2000-039702 A | 2/2000 | |
| JP | 2001-026052 A | 1/2001 | |
| JP | 2002-268146 A | 9/2002 | |
| JP | 2003-165133 A | 6/2003 | |
| JP | 2003-211475 A | 7/2003 | |
| JP | 2004-098580 A | 4/2004 | |
| JP | 2004188822 A * | 7/2004 | |
| WO | 03/016014 A1 | 2/2003 | |

OTHER PUBLICATIONS

European Search Report issued Aug. 9, 2010, in European patent application No. 05780446.0.

* cited by examiner

PLASTICIZATION IS STARTED

UNDER PLASTICIZATION

SCREW IS MOVED FORWARD : MOLTEN RESIN IS DISCHARGED

METHOD AND APPARATUS FOR MANUFACTURING A MOLDED PRODUCT

TECHNICAL FIELD

The present invention relates to method and apparatus for manufacturing a molded product. Specifically, the invention relates to method and apparatus for manufacturing a molded product in which a molded product having precise microstructure, high dimensional precision, low residual stress, low birefringence, high optical-transparency and excellent mechanical strength can be provided in a three dimensional geometry, thin wall and large-area by a very low molding pressure molding process.

BACKGROUND ART

Presently, a molded product including a sub-μm ultra-minute uneven portion on a surface thereof and having a three dimensional geometry, thin wall and large-area is required for an optical part for an electronic display such as a micro-lens array or a part for optical information communication such as a multi-mode optical waveguide passage and the like.

Hereinafter, related method for manufacturing such molded product including a minute uneven portion on a surface thereof will be described.

Patent document 1 discloses an object to provide a method for efficiently manufacturing an optical molding having high optical-transparency, low birefringence and excellent mechanical strength, including a minute uneven portion and being thin wall and large area. Patent document 1 uses a press molding machine, which is composed of an upper metal mold and a lower metal mold which are spaced apart from each other and each of which includes a cavity surface. A minute uneven portion having a height or a depth of less than 50 μm is engraved on the cavity surface of one of the upper metal mold and the lower metal mold. In this method, a melted non halogen thermoplastic is supplied to the lower metal mold, and the molten resin is pressed while the temperature of the molten resin is in the temperature range of (Tg+10° C.) or higher to less than (Tg+150° C.) with respect to the glass transition temperature (Tg) of the molten resin.

Patent document 2 discloses an object to provide a manufacturing method which forms a minute uneven pattern accurately, prevents the uneven filling of a resin, enhances mold releasing efficiency and prevents the imhomogeneous temperature of a product or a molded product when it is released from a metal mold in order to obtain a bend-free, large area and thin wall molded product. According to patent document 2, a molten alicyclic polymer resin is filled into a cavity formed by a movable side metal mold, in which an inner surface thereof is coated with diamond-like carbon, and a fixed side metal mold. The molten resin is then compressed by the movable side metal mold.

Patent document 3 discloses an object to provide an efficient and high-precision method for transcribing a minute shape. Patent document 3 prepares a metal mold including a transcribe surface, on which an uneven pattern is engraved. The transcribe surface is pressed against a polymeric substrate, which is softened by heating up to a given temperature and is thereby softened. Then, the metal mold is forcibly pulled apart from the polymeric substrate at a given temperature. Accordingly, the uneven pattern is transcribed to the surface of the polymeric substrate.

Patent document 4 discloses an object to provide a method for manufacturing an optical product including an optical element such as a minute Fresnel lens shape, a minute lenticular lens shape or a minute prism lens shape with high quality and at a low cost. Patent document 4 includes a step of coating radiation-setting resin liquid over an entire surface of the minute uneven portion of a metal mold by using a slit nozzle.

Patent document 5 discloses an object to provide a minute pattern transcribing method in which forming a minute uneven pattern, which may be equal to or less than a wavelength of the light, on a transcribed member in a mass-producible manner at a lower cost. Patent document 5 prepares a transcribe member including a minute uneven pattern and pores a material which will be formed as the transcribed member onto the minute uneven pattern of the transcribe member in a state where the material is melted by heating. The poured molten material is cooled and solidified and, at the same time, the minute uneven pattern is transcribed to the solidified material. Then, the solidified material with the transcribed minute uneven pattern transcribed thereto is released from the transcribe member and is removed as the minute uneven pattern transcribed member.

Patent Document 1: JP-A-2003-211475
Patent Document 2: JP-A-2004-98580
Patent Document 3: JP-A-2001-26052
Patent Document 4: JP-A-2002-268146
Patent Document 5: JP-A-2000-39702

DISCLOSURE OF THE INVENTION

Problems that the Invention is to Solve

However, in the above-mentioned related methods, following problems have been found. That is, an optical distortion or bend may be occurred in the molded product, or an unfavorable phenomenon such as a variation in a dimension of the minute uneven pattern due to thermal shrinkage may be occurred (patent document 1); high pressure is necessary for pressing the resin (patent documents 1, 2 and 5); it is not suitable to manufacture a molded product having a three dimensional geometry, thin wall and large-area (patent document 2, 3); and the resin liquid may spray around and a defective product may be manufactured (patent document 4).

Means for Solving the Problems

In view of the above-mentioned circumstances, an object of the invention is to provide a method and apparatus for manufacturing a molded product having precise microstructure, high dimensional precision, low residual stress, low birefringence, high optical-transparency and excellent mechanical strength in a three dimensional geometry, thin wall and large-area by a very low molding pressure molding process.

According to a first aspect of the invention, there is provided a method for manufacturing molded products, comprising: a resin coating step of coating a molten thermoplastic resin onto a metal mold having a minute uneven pattern on a surface thereof; a compressing step of compressing the coated thermoplastic resin by the metal mold and arranging a shape of a final molded product; and a solidifying step of solidifying the coated thermoplastic resin by cooling the coated thermoplastic resin.

According to a second aspect of the invention, there is provided a method for manufacturing molded products, wherein the resin coating step includes: supplying the thermoplastic resin to a resin coating device including a discharge port; discharging the thermoplastic resin onto the minute uneven portion from above while moving the resin coating device; and filling the thermoplastic resin into the minute uneven portion. The resin coating step may further include heating the metal mold such that the thermoplastic resin is capable of adhesion to an inside of the minute uneven portion or to the cavity surface having a minute uneven portion. Also, the thermoplastic resin may also be filled into the minute uneven portion such that the thermoplastic resin has substantially the same shape and thickness as those of a final shape of the molded product.

According to a third aspect of the invention, the solidifying step is a step of cooling and solidifying the thermoplastic resin while applying a pressing force thereto.

According to a fourth aspect of the invention, the resin coating device is movable up to 6 degrees of freedom such that the thermoplastic resin is filled to a whole minute uneven portion from the discharge port of the resin coating device.

According to a fifth aspect of the invention, the minute uneven portion has a width or a diameter of 10 nm to 1 mm and has a depth or a height of 10 nm to 1 mm.

According a sixth aspect of the invention, a thickness of the molded product is in the range of 50 μm to 5 mm.

According to a seventh aspect of the invention, the metal mold comprises an upper metal mold and a lower metal mold, and at least one of the upper metal mold and the lower metal mold include a minute uneven portion.

According to a ninth aspect of the invention, the present molded product manufacturing method further comprises a series of following steps (a) to (i):

(a) a metal mold temperature raising step comprising: preparing an upper metal mold and a lower metal mold; raising a temperature of a cavity surface of the upper metal mold up to a temperature which is capable of maintaining a softened state of the thermoplastic resin contacted with the cavity surface of the upper metal mold such that, in a below-mentioned compressing step, the thermoplastic resin can be deformed so as to follow the shape of the cavity surface of the upper metal mold under a pressing force applied thereto without forming a frozen layer on the surface of the thermoplastic resin; and raising a temperature of the cavity surface of the lower metal mold up to a temperature such that a discharged thermoplastic resin in a below-mentioned resin coating step is capable of adhesion to an inside of the minute uneven portion or to the cavity surface having a minute uneven portion;

(b) a resin coating step comprising: discharging the thermoplastic resin from the discharge port of the resin coating device while moving the resin coating device in such a manner that the thermoplastic resin is filled into a whole minute uneven portion; and coating the thermoplastic resin until it forms substantially the same shape as the final shape of a molded product;

(c) a compressing step comprising fitting the upper metal mold and the lower metal mold with each other; and pressing the coated thermoplastic resin intervening between the cavity surface of the lower metal mold and the cavity surface of the upper metal mold by using a pressing force generating device; and arranging a shape of the thermoplastic resin into a shape of a closed space formed between the closed cavities;

(d) a solidifying step of solidifying the thermoplastic resin by cooling the thermoplastic resin down to a desired temperature while applying the pressing force to the thermoplastic resin;

(e) a mold unfastening step of opening the upper metal mold and the lower metal mold by a small amount within a range where the upper metal mold and the lower metal mold are mutually fitted with each other;

(f) a first releasing step of releasing one of the cavity surfaces of the upper metal mold and the lower metal mold from the molded product by using a releasing device installed on the metal mold;

(g) a second releasing step of releasing the other cavity surface than the cavity surface released in the (f) step from the molded product by using the releasing device installed on the metal mold;

(h) a mold opening step of opening the metal mold to a distance such that the molded product is capable of being removed from the metal mold; and (i) a molded product removing step of removing the molded product from the metal mold.

According to a ninth aspect of the invention, the (c) step includes: sucking an air within a minute clearance, which is formed between the cavity surface of the upper metal mold and the top surface of the thermoplastic resin in a state where the upper metal mold and the lower metal mold are fitted with each other, so as to provide a pressure reduced state or a substantially vacuum state; contacting the cavity surface of the upper metal mold and the top surface of the thermostatic resin are contacted with each other; and applying a pressing force to the thermostatic resin.

According to a tenth aspect of the invention, there is provided a molded product manufacturing apparatus, which comprises: a metal mold which includes a minute uneven portion on a surface thereof; heating means which heats the metal mold; cooling means which cools the metal mold; and a resin coating device which fills a molten thermoplastic resin into the minute uneven portion. The resin coating device may include: a plasticizing part which plasticizes the thermoplastic resin into a melted state; a resin reserving part which reserves the molten thermoplastic resin therein; and a discharge port which discharges the molten thermoplastic resin therefrom. The resin coating device may be movable in such a manner that the molten thermoplastic resin is discharged onto the minute uneven portion from above. The leading end portion of the discharge port may also be tapered. The discharge port may also include a pouring gate at least in one of its front and rear portions in a resin coating advancing direction.

According to an eleventh aspect of the invention, the resin coating device is movable up to 6 degrees of freedom.

According to a twelfth aspect of the invention, the resin reserving part is a reserving cylinder which, after it reserves once the molten resin poured therein, injects the molten resin in a predetermined feed rate.

According to a thirteenth aspect of the invention, the reserving cylinder includes: a cylinder which reserves the molten resin, a piston which is located in the cylinder and injects the molten resin; and piston drive means which moves back and forth the piston. A clearance portion, through which the molten resin is allowed to pass, is formed between the cylinder and the piston. The apparatus is configured to: move the piston backward by using the piston drive means when the molten resin flows into the cylinder from the plasticizing part; reserve a predetermined amount of the molten resin into the cylinder gradually from the leading end portion of the cylinder; and move the piston forwardly and inject the molten resin from the cylinder in the predetermined feed rate.

According to a fourteenth aspect of the invention, the piston pushes and injects the molten resin in the predetermined feed rate.

According to a fifteenth aspect of the invention, the apparatus further comprises a valve in a connecting flow passage interposed between the plasticizing part and the storing cylinder, the valve opening and closing the connecting flow passage.

According to a sixteenth aspect of the invention, the discharge port discharges the molten resin while moving in a state where the discharge port is supported by a highly rigid guide.

According to a seventeenth aspect of the invention, the discharge port is supported on both sides thereof by at least one highly rigid guide located along the coating direction of the molten resin, and the highly rigid guide is fixed by two or more support members respectively located on the upstream and downstream sides of the coating direction of the molten resin.

According to an eighteenth aspect of the invention, the above-mentioned discharge port is supported through a support member by a highly rigid guide located along the coating direction of the molten resin, and the highly rigid guide is fixed to the main body of the manufacturing apparatus with the resin coating device mounted thereon.

According to a nineteenth aspect of the invention, the present molded product manufacturing apparatus further comprises moving means which moves a resin coated surface of the lower metal mold in a vertical direction. The moving means may adjust a distance between the leading end portion of the discharge port which discharges the molten resin and the resin coated surface of the lower metal mold. The moving means may be a platen of a pressing machine which mounts the lower metal mold thereon and presses the upper metal mold and the lower metal mold, and a distance between the discharge part and the resin coated surface of the lower metal mold may be adjusted by a vertical movement of the platen. Further, the moving means may be a vertically moving stage which is interposed between the lower metal mold and a platen of a pressing machine and presses the upper metal mold and the lower metal mold, the platen mounting the lower metal mold thereon, and a distance between the discharge part and the resin coated surface of the lower metal mold may be adjusted by a vertical movement of the vertically moving stage. Still further, the moving means may also be means for moving only the resin coated surface of the lower metal mold in the vertical direction, and a distance between the leading end portion of the discharge port and the resin coated surface of the lower metal mold may be adjusted by a vertical movement of the means.

Effects of the Invention

According to the invention, there can be provided a method and apparatus for manufacturing a molded product having precise microstructure, high dimensional precision, low residual stress, low birefringence, high optical-transparency and excellent mechanical strength in a three dimensional geometry, thin wall and large-area by a very low molding pressure molding process.

DESCRIPTION OF REFERENCE NUMERALS

Figure 1:
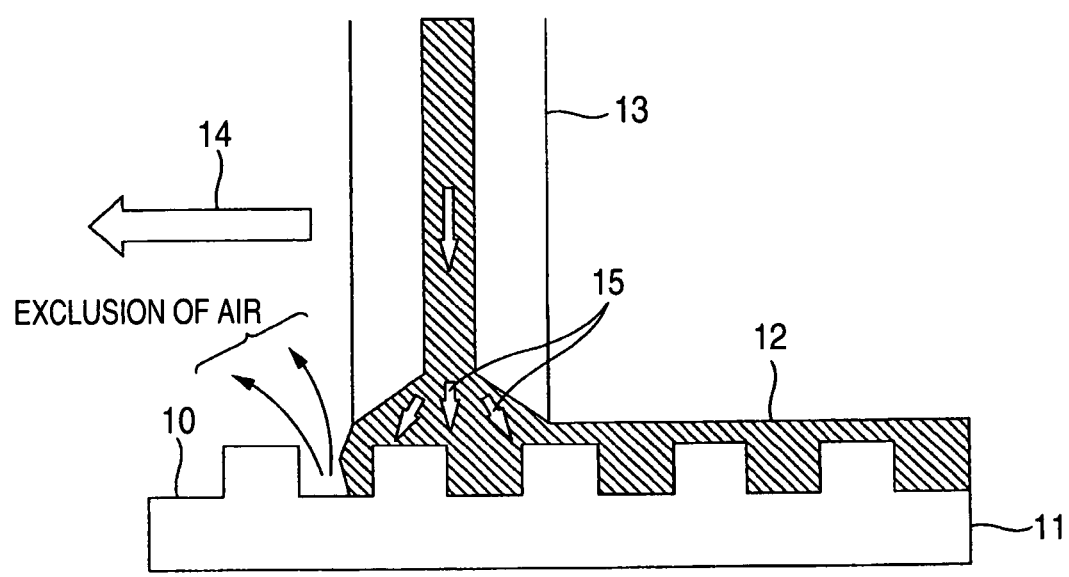
FIG. 1 An explanatory view of a resin coating step included in a molded product manufacturing method according to the invention.

10: Minute uneven portion
11: Forming mold
12: Molten thermoplastic resin
13: Discharge port
21: Lower metal mold
23: Stamper
24: Upper metal mold
25: Molded product
61: Plasticizing part 65: Resin reserving part
131: Resin coating device
132: Plasticizing part
133: Flexible flow passage
140: Stamper
141: Lower metal mold
142: Upper metal mold
143: Precision pressing machine
147: Six-divided discharge port
210: Reserving cylinder
232: Lower metal mold
1101: Cylinder
1102: Piston
1103: Piston drive means

BEST MODE FOR CARRYING OUT THE INVENTION

Now, description will be given below in more detail of the invention with reference to the accompanying drawings.

FIG. 1 is an explanatory view of a coating step included in a method for manufacturing a molded product according to the invention. According to FIG. 1, onto a metal mold 11 (sectional view) having a minute uneven portion 10 on the surface thereof, there is discharged a molten thermoplastic resin 12 (which is hereinafter referred to as molten resin as well) from a discharge port 13 (sectional view) formed in a resin coating device, whereby the molten resin 12 is filled into the minute uneven portion 10. In a state shown in FIG. 1, while moving the resin coating device (not shown) in the arrow mark 14 direction and thus moving the discharge port 13 as well in the arrow mark 14 direction, the molten resin 12 is discharged onto the minute uneven portion 10 from above.

In a general injection molding method and a related method, the surface layer of resin filled into a cavity formed in a metal mold lowers in temperature immediately, whereby the viscosity of the resin starts to increase and a frozen layer starts to form on the surface of the resin. Therefore, in order to press the hard surface layer of the resin against the minute uneven portion to transcribe the shape of the minute uneven portion to the hard resin surface layer, a powerful pressing force is required.

On the other hand, according to the invention, while moving the discharge port 13 in the arrow mark 14 direction, the molten resin 12 is discharged onto the minute uneven portion 10 from above. Therefore, the molten resin 12 reaches the inside of the minute uneven portion immediately. Accordingly, a decrease in the temperature of the resin is a very small and an increase in the viscosity of the resin is little. That is, the molten resin 12 reaches the inside of the minute uneven portion 10 in an ideally low viscosity state. Since the filling of the molten resin 12 can be attained by discharging the molten resin from the discharge port 13, such a powerful pressing force as in the related method is not necessary at all. In other words, in FIG. 1, if the molten resin 12 can be discharged from the discharge port 13 in the arrow marks 15 directions, almost all of the shape of the minute uneven portion 10 provided on the surface of the metal mold 11 can be transcribed to the molten resin only by the above-mentioned resin coating operation.

Also, the shorter the distance between the discharge port 13 and metal mold 11 is (the smaller the thickness of the resin to be coated is) as well as the shorter the time necessary for the molten resin to reach the minute uneven portion 10 is, the more the decreasing amount of the temperature of the molten resin 12 can be restricted. In a molded product manufacturing method according to the invention, the molten resin 12 is discharged onto the minute uneven portion 10 from above while moving the discharge port 13. Thus, as the distance between the discharge port 13 and metal mold 11 is reduced and the time for the molten resin 12 to reach the minute uneven portion 10 is shortened, the molten resin having a small amount of temperature decrease and a low degree of viscosity can be reached the inside of the minute uneven portion 10 easily, and the shape of the minute uneven portion 10 can be transcribed to the molten resin easily. Accordingly, a molded product manufacturing method according to the invention is very advantageous in manufacturing a thin wall molded product.

Further, according to the method of the invention, since the molten resin 12 is filled into the uneven portion 10 from above while moving the discharge port 13, the air of the inside of the minute uneven portion 10 can be discharged in the arrow mark 16 direction. This eliminates a possibility of a case in which the air is confined in a space between the minute uneven portion 10 and molten resin 12 whereby obstructs the transcribe of the minute uneven shape to the molten resin.

Incidentally, the minute uneven portion 10 according to the invention can be selected from a wide range of shapes which have a width or a diameter of 10 nm to 1 mm and a depth or a height of 10 nm to 1 mm.

Figure 2:
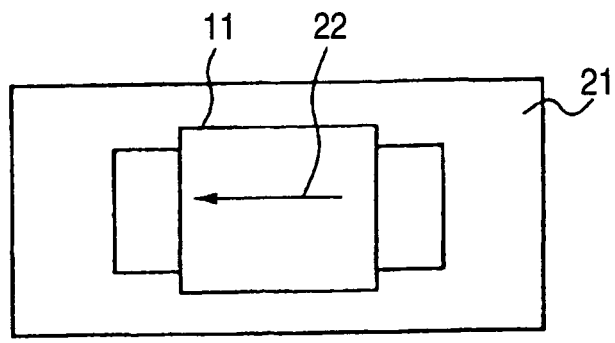
FIG. 2 Explanatory views of a process for manufacturing a molded product having a complicated three-dimensional shape using a method according to the invention.
Figure 2:
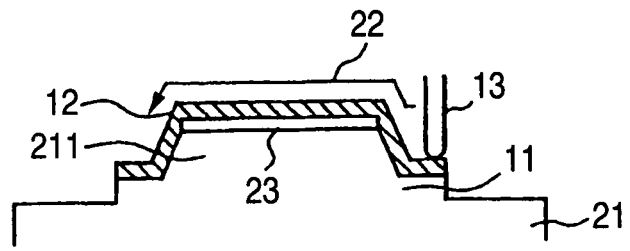
Figure 2:
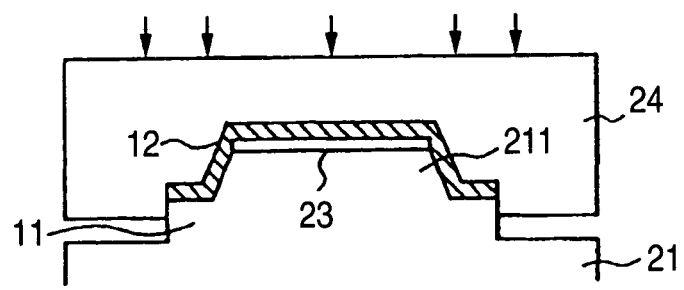
Figure 2:
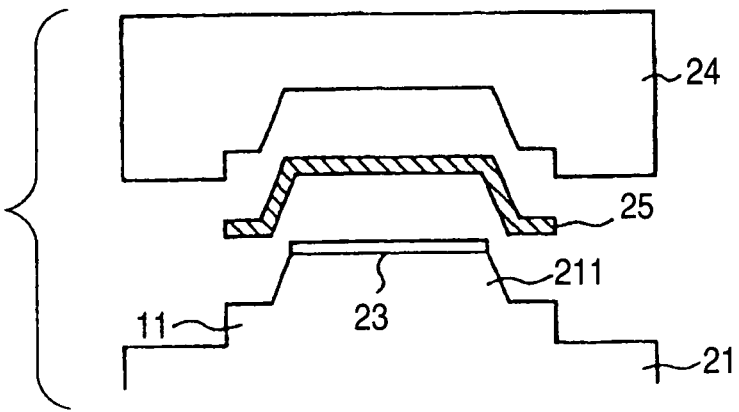

FIG. 2 shows explanatory views of a process for manufacturing a molded product having, a complicated three-dimensional shape by using a method according to the invention. In a state shown in FIG. 2, there are used two metal molds: an upper metal mold and a lower metal mold.

FIG. 2(a) is a plan view of the metal mold 11 placed on a lower metal mold 21, and FIG. 2(b) is a front view of the metal mold 11. In an embodiment shown in FIG. 2, the molten resin is coated one time in an arrow mark 22 direction shown in FIG. 2(a) using a discharge port having a large width. Also, as part of the metal mold 11, a stamper 23 having a minute uneven portion on the surface thereof is used. This stamper 23 is placed on the projecting portion 211 of the lower metal mold 21. Incidentally, in order that the molten resin is allowed to adhere to the surface of the minute uneven portion or to a cavity surface having a minute uneven portion, the metal mold 11 and stamper 23 are heated. In FIG. 2(b), while moving the discharge port 13 in the arrow mark 22 direction and along the shapes of the lower metal mold 21 and stamper 23, the molten thermoplastic resin 12 is coated in shape and thickness which are almost similar to those of a final shape of the molded product (resin coating step). Next, in FIG. 2(c), an upper metal mold 24 is moved downward to press the coated thermoplastic resin and arrange the shape of a molded product (compressing step). Next, in FIG. 2(d), with the pressing force left applied, the thermoplastic resin is cooled and solidified (solidifying step). Then, the metal mold is opened and the molded product 25 is removed from the metal mold.

Now, description will be given below in more detail of a molded product manufacturing method according to the invention.

A specially preferred method according to the invention may include a series of the following steps (a) to (i):

(a) As shown in FIG. 2, there are prepared two metal molds: a lower metal mold 21 and an upper metal mold 24. The temperature of the upper metal mold 24 is raised up to a temperature where, in the compressing step, a frozen layer is not formed on the surface layer of the molten resin 12 contacted with the cavity surface of the upper metal mold 21 but the molten resin 12 can maintain such a softened state as to allow the molten resin 12 to be deformed after the shape of the cavity surface of the upper metal mold 24 under the pressing force applied. Further, the temperature of the cavity surface of the lower metal mold 21 is raised up to a temperature where the molten resin 12 is able to adhere to the inside of the minute uneven portion or to the cavity surface having a minute uneven portion (mold temperature raising step);

(b) After completion of raising the temperatures of the metal molds, in order that the molten resin 12 can be filled into the whole of the minute uneven portion from the discharge port 13, the molten resin 12 is discharged from the discharge port 13 while moving the discharge port 13, and the molten resin 12 is coated until it forms substantially the same shape as the final shape of a molded product (resin coating step);

(c) After completion of the resin coating step, the upper metal mold 24 and the lower metal mold 21 are fitted with each other, and a pressing force generating device is used to press the molten resin 12 which exists between the cavity surface of the lower metal mold 21 and the cavity surface of the upper metal mold 24, thereby arranging the shape of the molten resin 12 to follow the shape of a closed space defined by and between the two closed cavities (compressing step);

(d) While the pressing force is left applied in order to compensate the shrinkage of the molten resin 12 involved with the cooling of the molten resin 12, the thermoplastic resin is cooled down to a desired temperature and is solidified (solidifying step);

(e) After completion of the solidifying step, the upper metal mold 24 and the lower metal mold 21 are opened by a minute amount in the range where their mutual fitted state can be maintained (mold unfastening step);

(f) One of the cavity surfaces of the upper metal mold 24 and the lower metal mold 21 is released from the molded product using releasing means (not shown) installed on the metal mold (first releasing step);

(g) The other cavity surface than the cavity surface released in the (f) step is released from the molded product (second releasing step);

(h) The metal mold is opened to such a distance that the molded product can be removed therefrom (mold opening step); and (i) The molded product is removed from the metal mold (molded product removing step).

In the (a) step, as regards the temperature of the cavity surface of the lower metal mold, the "temperature where the molten resin 12 to be discharged in the resin coating step is able to adhere to the inside of the minute uneven portion or to the cavity surface having a minute uneven portion" can be determined according to the conditions of the surface of the metal mold 11 (such as the surface roughness), the mother material of the metal mold 11 (such as the presence or absence of a treatment using a mold release agent), the kinds and temperature of the molten resin, the moving speed (resin coating speed) of the resin coating device, and the like.

Figure 3:
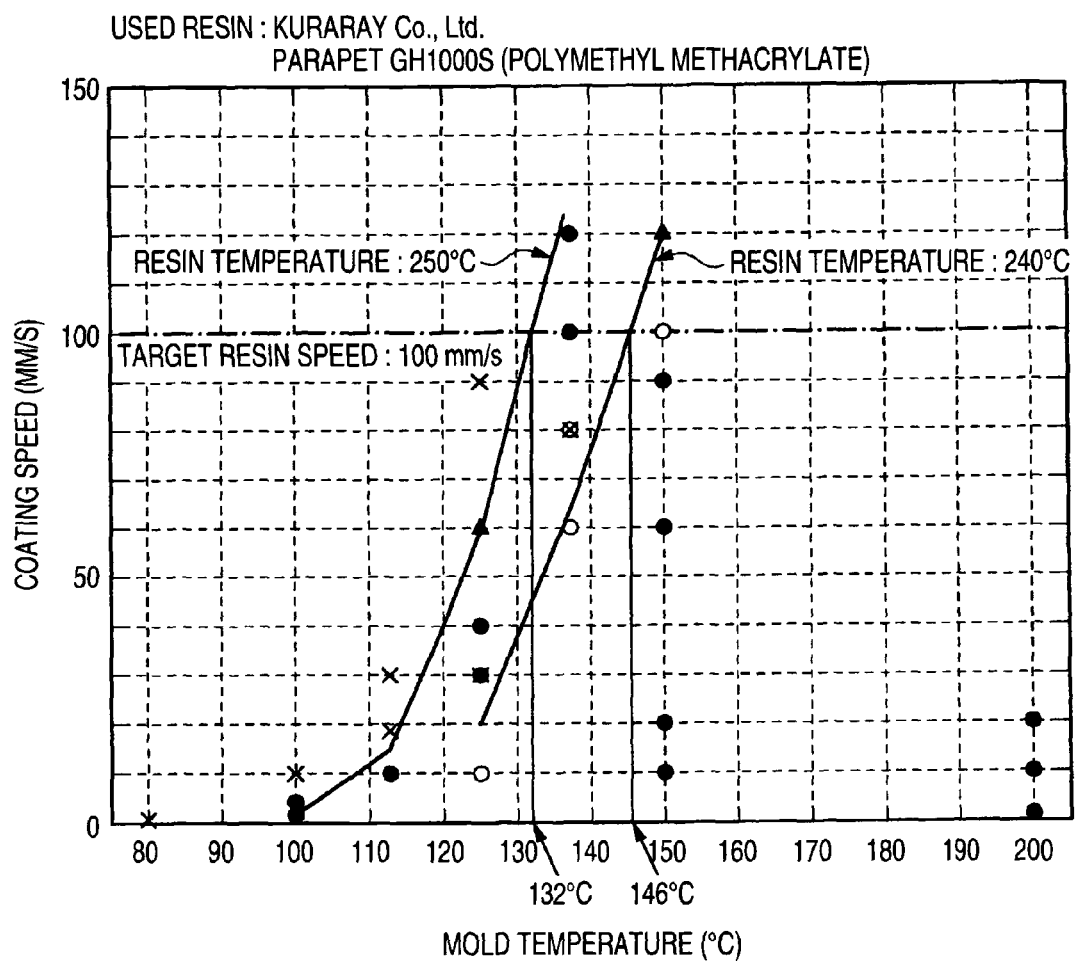
FIG. 3 An explanatory view to show how to determine the temperature of the cavity surface of a lower metal mold.

FIG. 3 is an explanatory view to show how to determine the temperature of the cavity surface of the lower metal mold. In FIG. 3, a polymethyl methacrylate manufactured by Kuraray Co., Ltd. (Parapet GH1000S) is coated on a surface of a cavity made of stainless steel (SUS304) and finished with surface roughness of 1.6 S while varying the resin temperature, cavity temperature and coating speed, thereby finding out the conditions that can achieve good resin coating. Incidentally, no mold releasing treatment is executed on the cavity surface at all. FIG. 3 shows that, provided that the target coating speed is set for 100 mm/s, when the resin temperature is 240° C., the temperature of the metal mold cavity may be set at a temperature of about 145° C. or higher; and also, when the resin temperature is set for 250° C., the cavity temperature may be set at a temperature of 130° C. or higher.

In this manner, according to the invention, in the resin coating step, since the transcribe of the shape of the minute uneven portion to the molten resin is completed simultaneously with the coating of the molten resin, it is not necessary to maintain the metal mold at a very high temperature as disclosed in the related method. Therefore, the thermal degradation of the molten resin can be restricted, and also the dimensional variation of the molten resin due to the thermal expansion and shrinkage of the molten resin can be reduced. This can enhance the dimensional accuracy of the molded product, reduce the heating and cooling time of the metal mold and shorten the production time of the molded product. Therefore, the mold manufacturing method of the invention is very advantageous in that it can manufacture the molded product at a low cost.

Incidentally, the raising of the temperature of the cavity of the upper metal mold may be completed before the metal mold is closed in the compressing step and the cavity is contacted with the upper surface of the coated molten resin. Therefore, the raising of the temperature of the upper metal mold may also be started, for example, during the resin coating step. The raising of the temperature of the cavity of the lower metal mold may be completed before the molten thermoplastic resin is contacted with the metal mold in the resin coating step.

In the (b) step, generally, differently from, for example, an ultraviolet cure resin, the molten resin has a given level of viscosity (for example, 1000 Pa·s or more) even when it is in a melted state. Therefore, the molten resin 12 can be coated until the coated molten resin has substantially the same shape as the final shape of the molded product. Incidentally, in the embodiment shown in FIG. 2, the discharge port 13 is moved once for coating the molten resin once in the arrow mark 22 direction using a wide discharge port. However, the invention is not limited to this. For example, the molten resin may also be coated while reciprocating the discharge port 13 two or more times. In this case, preferably, the resin coating device having the discharge port 13 may be set so as to be able to move up to the six degrees of freedom, whereby, even when the metal mold 11 has a further complicated shape such as a three-dimensional shape, the discharge port 13 is able to follow the shape of the metal mold 11. Incidentally, description will be given later of a resin coating device capable of such movement. Also, supply of the molten resin to the resin coating device may be completed before the resin coating is executed. Preferably, such molten resin supply may be executed in the step where the resin coating device is not in operation such as in the resin solidifying step or in the mold unfastening step. In this case, the molten resin can be coated immediately after completion of the metal mold temperature raising step. Therefore, the time (the cycle time) necessary for the molding operation can be reduced.

In the (c) step, the pressing pressure can be set for 10 MPa or less. The reason for this is as follows: that is, since the molten resin is coated in a shape substantially the same as the final shape of the molded product, there is no need to deform and move the coated molten resin by applying a high pressing force; and also, since the molten resin during compression is soft, the shape of the minute uneven portion can be transcribed to the molten resin with a very low pressing force. Therefore, even when the pressing force generating device is small, a product of a large area can be manufactured. This leads to the size reduction, space saving, energy saving and cost reduction of the molded product manufacturing apparatus. Also, since the molten resin within the cavity flows little during compression, phenomena, which give rise to optical distortion or bend, such as the polymer chain orientation involved with the flow of the molten resin are hard to occur in the compressing step as well. Further, in the compressing step and its following step such as the resin coating step, a high viscous thermoplastic resin cannot be forced to flow. As a result, when compared with a related injection molding method and the like, the molded product manufacturing method of the invention can provide a molded product which not only has excellent optical characteristics such as low residual stress, low birefringence and high optical-transparency, but also has high dimensional accuracy free from a bend. Further, the minute uneven portion 10 of the metal mold 11 is hard to destroy, which leads to the extended life of the metal mold 11. Still further, since a powerful pressing force is not necessary, a metal mold made of zinc selenide (ZnSe) or silicon (Si) having no tolerance against pressure can be used. These materials are infrared ray transmission materials. Therefore, when these materials are used as the cavity surface and infrared rays are radiated onto the thermoplastic resin through such cavity surface as disclosed in Japanese Patent No. 3169786, the temperature reduction of the thermoplastic resin can be restricted and thus the transcribe of the shape of the minute uneven portion can be attained with more accuracy.

Incidentally, if a heating plate is inserted onto the coated molten resin to heat the top surface of the molten resin to thereby reduce the viscosity of the molten resin temporarily just before pressing the coated molten resin, and the molten resin is then pressed, the shape of the molded product can be arranged with further reduced pressure. The heating plate may be a plate on which an infrared lamp such as a halogen lamp mounted, or a plate which is heated by an ordinary heat transfer heater (this plate can heat the molten resin through the transfer of radiant heat from the plate). Further, the upper metal mold may be temporarily stopped just before the cavity surface of the upper metal mold is contacted with the resin, waiting for a rise in the temperature of the top surface of the resin due to the radiant heat from the cavity surface of the upper metal mold, and the molten resin may be pressed when the temperature of the molten resin top surface rises up to a desired temperature. According to any one of these examples of the heating means, since radiant heat is used, the heat transfer is approved even in the vacuum. Therefore, even when the below-mentioned pressure reducing/evacuating step is carried out, the heating of the molten resin can be achieved efficiently.

Incidentally, a precision pressing force generating device, which is capable of not only opening and closing a metal mold by moving one of the upper and lower metal molds but also mold fastening and pressing the resin, can be realized by a vertical pressing machine or the like.

In the below-mentioned pressure reducing/evacuating step, it is preferable to provide a function to detect the position of the metal mold accurately and stop temporarily the mold closing operation in a state where a minute clearance intervenes between the upper metal mold cavity surface and the molten resin top surface. In the solidifying step, it is preferable to close the metal mold by an amount corresponding to the volume shrinkage of the molded product (that is, high-precision pressing force control may be made) while allowing the pressing force to follow the set value with high accuracy in order to compensate the volume shrinkage of the molded product. Further, in the below-mentioned mold unfastening step, it is necessary to open the metal mold slightly only by a stroke smaller than the thickness of the molded product. Accordingly, the positioning and speed control of the metal mold when moving the metal mold as well as pressure control during the mold clamping (during compression) must be executed with relatively high accuracy. Therefore, it is preferred to employ a pressing force generating device which, as a drive system, uses a mechanism easy to achieve a precise control such as a servo motor.

In the (c) step, more preferably, in a state where the upper metal mold 24 and the lower metal mold 21 are fitted with each other and a minute clearance intervenes between the cavity surface of the upper metal mold 24 and the top surface of the thermoplastic resin, the air in the minute clearance may be sucked to thereby provide a pressure reduced state or a substantially vacuum state and, after then, the cavity surface of the upper metal mold 24 and the top surface of the thermoplastic resin may be contacted with each other and the pressing force may be then applied to the resin. This can remove the air intervening between the molten thermoplastic resin and the cavity of the upper metal mold 24, which can in turn avoid poor transcription possibly caused by the air trapped and confined in such minute clearance.

The air suction port may be formed specially in the cavity surface. However, in the case of a metal mold including a mechanical ejector, for example, the air can be sucked from a clearance in the cavity formed due to the sliding motion of the ejector. As the sucking means, a well-known vacuum pump or the like may be used. The present pressure reducing/evacuating step can be executed with more efficiency in a metal mold composed of upper and lower metal molds and structured such that the cavities of the upper and lower metal molds have male and female shapes and, when the upper and lower metal molds are fitted with each other in the mold closing step, the male side cavity is inserted into the female side cavity by a slight amount to thereby form a closed space. The timing for pressure reducing and providing a substantially vacuum state may preferably be set in the time when, after formation of the closed space, a minute clearance intervenes between the cavity surface of the upper metal mold and the top surface of the molten resin. The reason for this is that, after the cavity surface and molten resin are contacted with each other and the air is confined between them, the effect of the air suction cannot be obtained if no suction port formed in the air closed range. In order to execute the operation of the pressure reducing/evacuating step at a proper timing, for example, by detecting the position of the metal mold from the pressing force generating device, the suction means may be started when the metal mold reaches a desired position, and the suction means may be stopped at a position where the cavity surface of the upper metal mold is perfectly contacted with the top surface of the molten resin. Other various embodiments are also possible. For example, there may be carried out the following operation: start of the suction means→stop of the mold closing operation→suction of the air for a given time under control using a timer→resumption of the mold closing operation. Also, there may be provided means for detecting the pressure in the cavity. After the air is sucked, at a time when the pressure of the cavity is reduced down to a desired pressure, the mold closing operation may be resumed.

In the (d) step, since the molded product is cooled until the temperature of the molded product reaches a desired temperature while the pressing is left applied, it is possible to prevent defect such as a sink mark possibly caused by the volume shrinkage of the resin, thereby being able to obtain a high-quality molded product which has high dimensional accuracy.

In the (e) step, the amount of opening of the metal mold may be larger than the height or depth of the minute uneven portion.

In the (f) to (i) steps, as the installed releasing device on the metal mold, there can be used a mechanical ejector or an air blow mechanism respectively embedded in the metal mold. The entire surface of the molded product can be released from the cavity surface by using such releasing device. When a minute releasing portion is formed between the molded product and cavity surface by the pressing force of the mechanical ejector or by a discharge pressure to be applied to fluid discharged from a fluid discharge port, the fluid enters the releasing portion. Then, the discharge pressure propagates to promote the next releasing, thereby the releasing portion is gradually expanded. This phenomenon occurs successively, with the result that the entire surface of the molded product is released from the cavity surface. In the above-mentioned description, more preferably, there may be employed the well-known air blow mechanism, that is, a mechanism in which a discharge port for discharging the fluid such as the air is formed in the cavity surface (preferably, in the center of the molded product), and the fluid is discharged from the discharge port. In the mechanical ejector system, because the mechanical ejector can push (apply an exfoliative force) only a local portion of the surface of the molded product, there is raised a problem that, if the molded product becomes thin in the thickness, the molded product can be broken or destroyed before the surface of the molded product is released from the cavity surface. As described above, according to the method in which the fluid with the pressure applied thereto is fed into the releasing portion, the pressing force can be applied to the whole of the releasing portion to thereby generate the releasing force uniformly. Accordingly, it is easy to release a thin wall molded product. Next, the metal mold is opened to such a distance that the molded product can be removed therefrom, and the molded product is then removed from the metal mold.

The thermoplastic resin to be used in the invention is not limited to specific resin but there can be used various kinds of resin. For example, polymethyl methacrylate (PMMA), polycarbonate (PC), cyclo olefin polymer (COP), polyethylene telephtalate (PET), polybutylene telephtalate (PBT), polyarylate (PAR), polyimide (PI), polypropylene (PP), polyamide (PA), polyethylene (PE), polyacetal (POM), ethylene vinyl acetate copolymerization resin (EVA), acryl nitrile butadiene styrene (ABS), poly vinyl chloride (PVC), poly phenylene oxide (PPO), or mixtures of these resin can be used. Also, there may also be employed the thermoplastic resin that is produced specially so as to match the desired performance of a molded product.

Incidentally, as for the thermoplastic resin, there can be added various kinds of well-known additives as the need arises. For example, various fillers such as glass fibers or carbon, heat resisting stabilizers, weatherproof stabilizers, antistatic agents, slip agents, anti-blocking agents, anti-misting agents, lubricants, dyes, pigments, natural oil, synthetic oil, wax, or the like, can be added.

According to a molded product manufacturing method of the invention, there can be obtained a molded product which has a small thickness in the range of 50 μm to 5 mm and a large area with a side length of the molded product exceeding 1000 times the thickness of the molded product.

Next, description will be given below of a molded product manufacturing apparatus according to the invention.

A molded product manufacturing apparatus according to the invention is characterized in that it comprises a metal mold which includes a minute uneven portion on a surface thereof; heating means which heats the metal mold; cooling means which cools the metal mold; and a resin coating device which fills a molten thermoplastic resin into the minute uneven portion, wherein the resin coating device includes: a plasticizing part which plasticizes a thermoplastic resin; a resin reserving part which reserves the plasticized molten resin therein; and a discharge port which discharges the molten thermoplastic resin therefrom, and wherein the resin coating device is movable in such a manner that the molten thermoplastic resin is discharged onto the minute uneven portion from above.

The metal mold including a minute uneven portion on the surface thereof may be set in any portion of the cavities of the upper and lower metal molds so as to match the required performance of the molded product, as described above. Preferably, it may be set in the cavity surface of the lower metal mold onto which the molten resin is precision coated by the resin coating device, whereby the shape of the minute uneven portion can be transcribed under low pressure and with high accuracy. According to the invention, a minute uneven portion may be engraved on the surface of a stamper using a semiconductor process such as a photolithography method, an electroplating method, and an ion etching method, and the formed minute uneven portion may be set within a metal mold. As the material of the stamper, there can be used nickel (or a nickel alloy), silicone, glass, or the like. The stamper may be made of only such material. Further, there may be formed a minute uneven portion made of a nickel or the like on a plate-shaped mother member (a silicone base plate) having a thickness of, for example, several tens μm to several mm. Besides this, a minute uneven portion may also be formed directly on the cavity surface of the main body of the metal mold. The section shape of the uneven portion is basically rectangular but it may also be tapered (trapezoidal), triangular, semi-circular, or semi-elliptic.

As the means for heating and/or cooling the cavity surfaces of the upper and lower metal molds, there are available various methods.

As the heating means, for example, there are available the following methods.

(1) A method for heating the cavity surface by passing a temperature controlled heat medium such as water (hot water) or oil through a flow passage formed in the metal mold for the heat medium.

(2) A method for heating the cavity surface by mounting or inserting an electric heater such as a plate heater or a cartridge heater on the metal mold.

(3) A method for heating the cavity surface of the metal mold by radiating infrared rays onto the cavity surface using a device for radiating infrared rays such as a halogen lamp or a far infrared heater.

(4) A method for heating the cavity surface by using induced heat.

Figure 4:
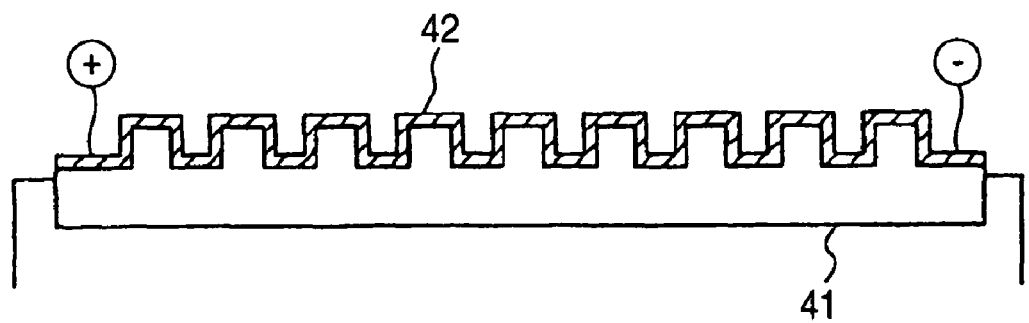
FIG. 4 Explanatory views of an example of means for heating a metal mold.
Figure 4:
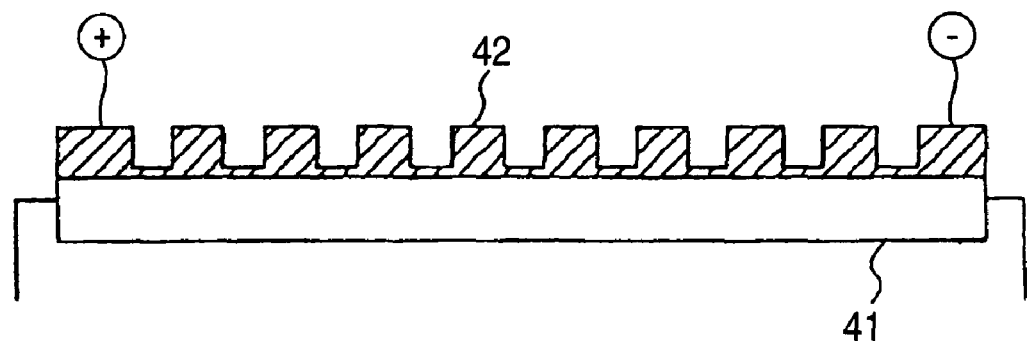

(5) A method in which, as shown in FIG. 4, a thin conductive membrane 42 is formed on the surface of the cavity main body 41 made of an electric insulator, and the conductive membrane 42 is electrically energized so as to generate heat in the conductive membrane 42. In this case, the uneven portion may be coated with the conductive membrane 42 (FIG. 4(a)), or the uneven portion itself may be formed of the conductive membrane 42 (FIG. 4(b)).

Figure 5:
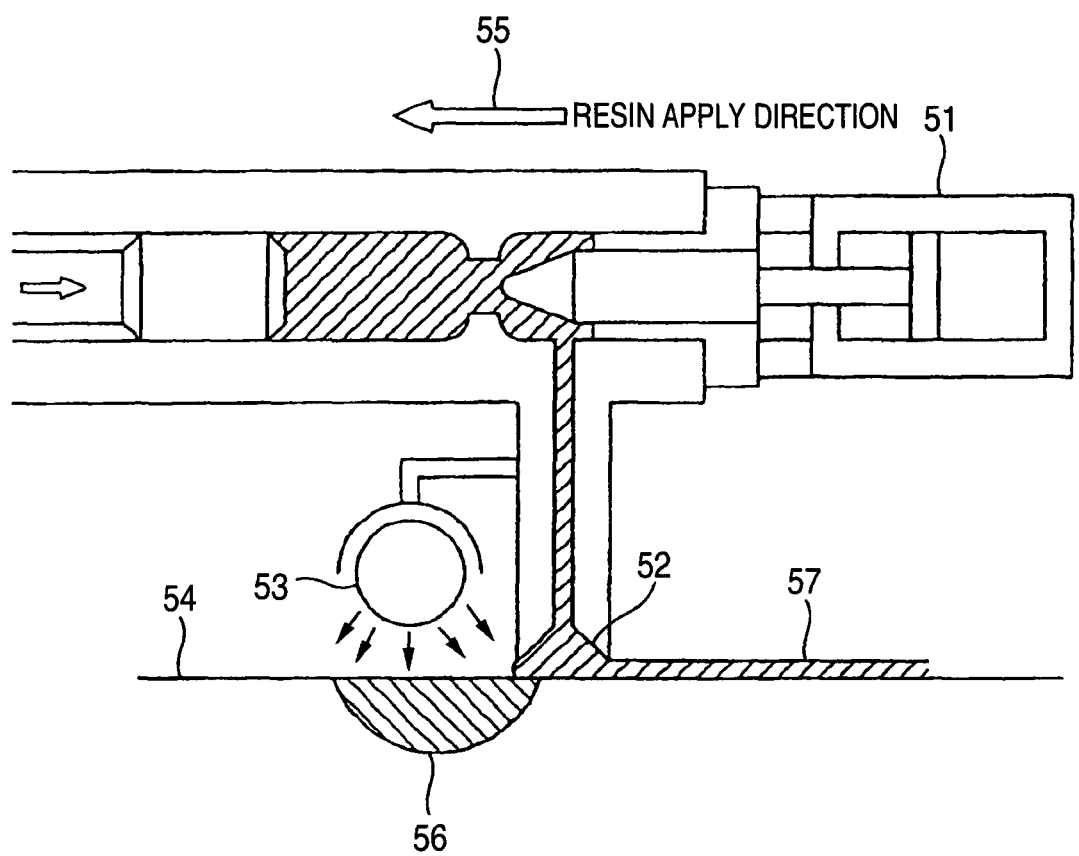
FIG. 5 An explanatory view of another example of means for heating a metal mold.

The above methods are examples of the means for heating the whole of the cavity surface (or the metal mold). Further, as shown in FIG. 5, heating means 53 such as an infrared lamp may be provided in the vicinity of the discharge port 52 of a resin coating device 51, and the molten resin may be coated while locally heating the surface of the cavity 54 just before the molten resin is coated so as to raise the temperature of the cavity 54 surface up to a temperature where the molten resin is able to adhere to the cavity 54 surface. Incidentally, in this case, the moving direction of the resin coating device is a direction shown by the arrow mark 55, a reference numeral 56 designates the portion that is heated locally by the heating means 53 such as an infrared lamp, and a reference numeral 57 stands for the coated molten resin. According to the states respectively shown in FIGS. 4 and 5, the temperature of the whole of the cavity can be left low. Therefore, the thermal degradation of the resin can be restricted, and the time and energy required for cooling and solidifying the molded product can be reduced.

Next, as cooling means, there are available the following methods.

(1) A method for cooling the cavity surface by flowing temperature conditioned water through a medium flow passage formed in a metal mold.

(2) A method for cooling the cavity surface by flowing the air through a pipe conduit provided in a metal mold.

(3) A method for cooling the cavity surface by spraying the air or a mist, which is a mixture of volatile (changeable in phase from liquid to gas on the cavity surface) liquid and a gaseous body, onto the cavity surface.

(4) A method for cooling the cavity surface by carrying and discharging heat within a metal mold to the outside of the metal mold by using a heat pipe.

(5) A method for cooling the cavity surface by absorbing heat within a metal mold or heat on the cavity surface using an electric cooling device such as a Peltier element.

The above-mentioned heating and cooling means may be used in proper combination according to cases.

The plasticizing part may have a function to be able to plasticize resin into melted state and a function to be able to supply the thus molten resin to the resin reserving part of the resin coating device. As the plasticizing part, for example, there may also be used a single screw extruder or a twin screw extruder.

Figure 6:
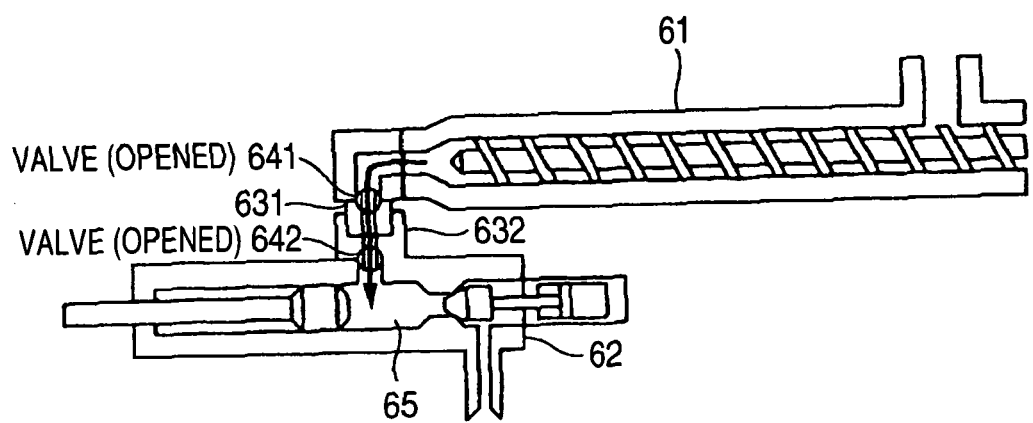
FIG. 6 Explanatory views of an example of a plasticizing part and a resin coating device.
Figure 6:
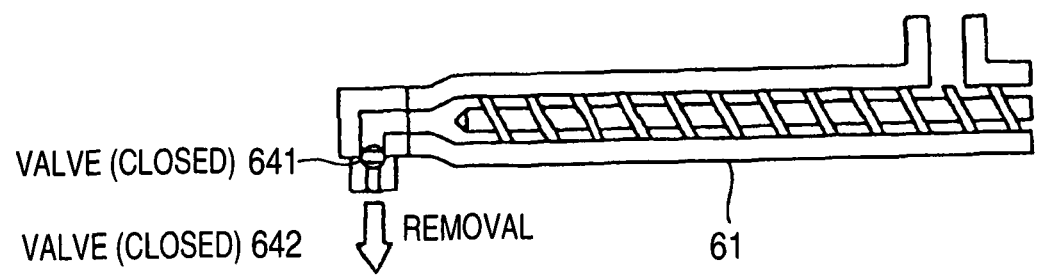
Figure 7:
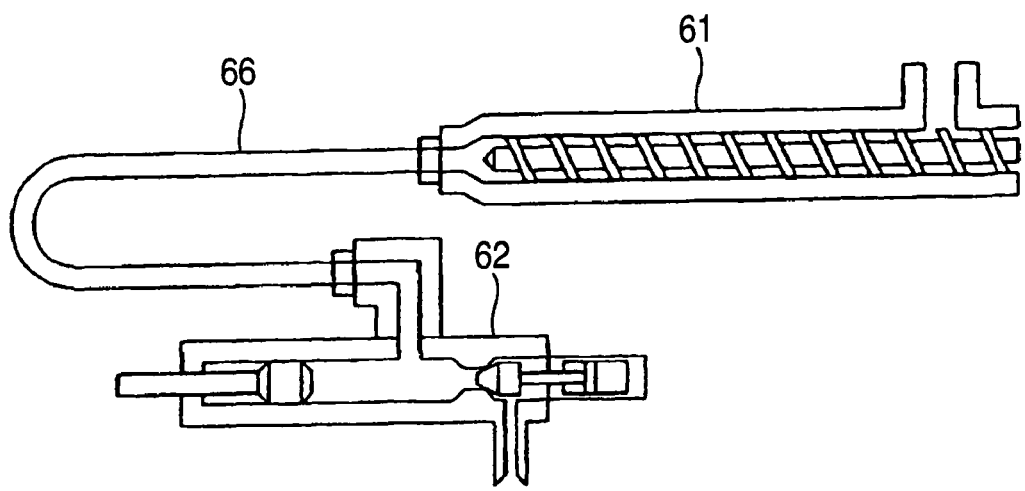
FIG. 7 An explanatory view of another example of a plasticizing part and a resin coating device.

Also, a resin coating device according to the invention may also be structured such that, as shown in FIG. 6(*a*), a mounting and removing mechanisms 631 and 632 are provided in both of a plasticizing part 61 and a resin coating device 62, respectively; the plasticizing part 61 is structured to be mountable onto and removable from the resin coating device 62; valves 641 and 642 capable of opening and closing their associated resin flow passages are provided in both of the plasticizing part 61 and resin coating device 62, respectively; in a state where the plasticizing part 61 and resin coating device 62 are connected together, both valves are opened to thereby allow the flow passages for molten resin to communicate with each other; the molten resin is fed from the plasticizing part 61 into the resin reserving part 65 of the resin coating device 62; and, at the time when a predetermined amount of molten resin is reserved, the valves 641 and 642 are respectively closed and the plasticizing part 61 is removed as shown in FIG. 6(*b*). Also, there may be employed a structure as shown in FIG. 7: that is, the plasticizing part 61 and resin coating device 62 are connected together by a flexible flow passage 66 and thus the molten resin can be fed into the resin coating device 62 from the plasticizing part 61.

Figure 8:
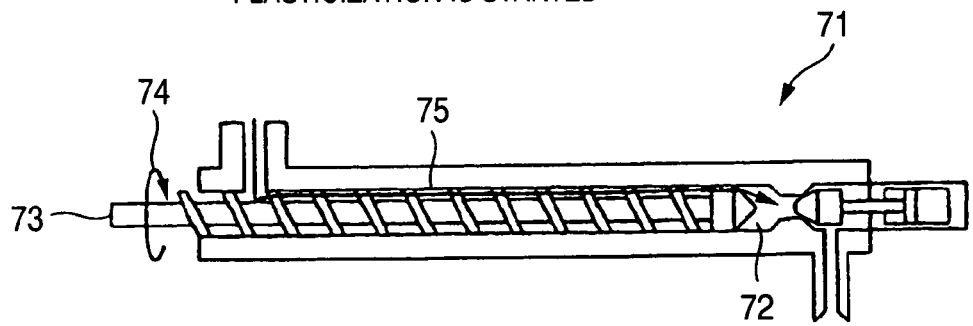
FIG. 8 Explanatory views of another example of a plasticizing part and a resin coating device.
Figure 8:
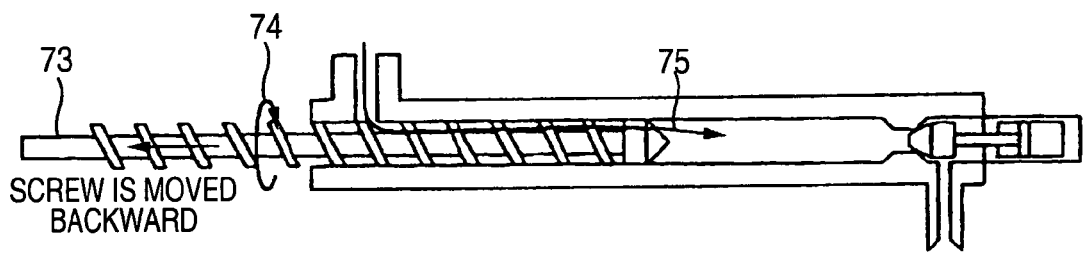
Figure 8:
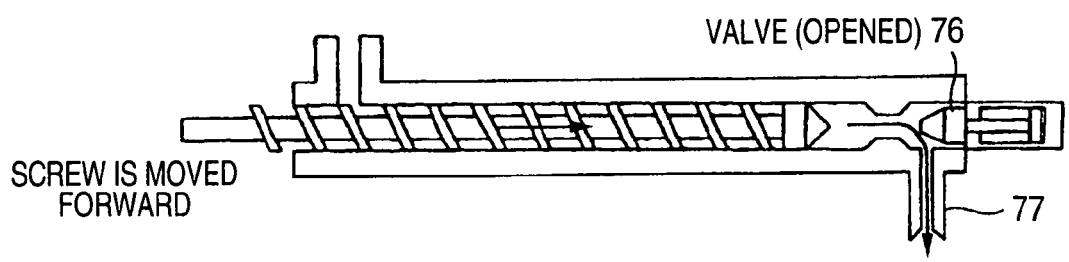

Instead of the above structures, as in an inline-type injection molding machine, the resin reserving part may have the function of the plasticizing part as well. For example, as shown in FIGS. 8(*a*) and 8(*b*), an inline-type injection molding machine 71 includes a resin reserving part 72 and a screw 73 which can be rotated and can be moved in the forward and backward directions. When the screw 73 is rotated in the arrow mark 74 direction, the screw 73 moves in the backward direction and a resin is plasticized while moving in the arrow mark 75 direction. After completion of the plasticization of the resin, as shown in FIG. 8(*c*), the molten resin reserved within the resin reserving part 72 is discharged from a discharge port 77.

Figure 9:
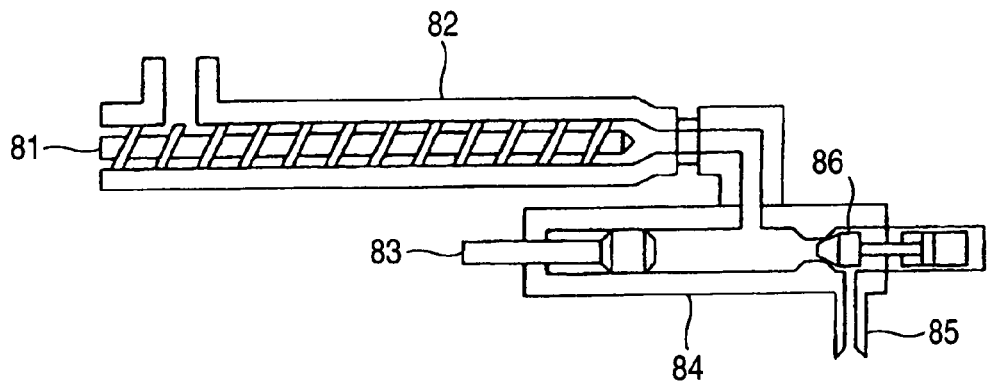
FIG. 9 An explanatory view of another example of a plasticizing part and a resin coating device.

Also, as in a pre-plasticizing type injection molding machine shown in FIG. 9, the resin coating device may be composed of a plasticizing cylinder 82 including a screw 81 and an injection cylinder 84 including a piston 83 movable in the forward and backward directions. In this device, molten resin plasticized in the plasticizing cylinder 82 may be fed to and reserved in the leading end portion of the injection cylinder 84. After then, the piston 83 may be moved forward so as to discharge the molten resin from a discharge port 85. Incidentally, reference numeral 86 designates a valve, and the molten resin can be discharged from the discharge port 85 by opening the valve 86.

Figure 10:
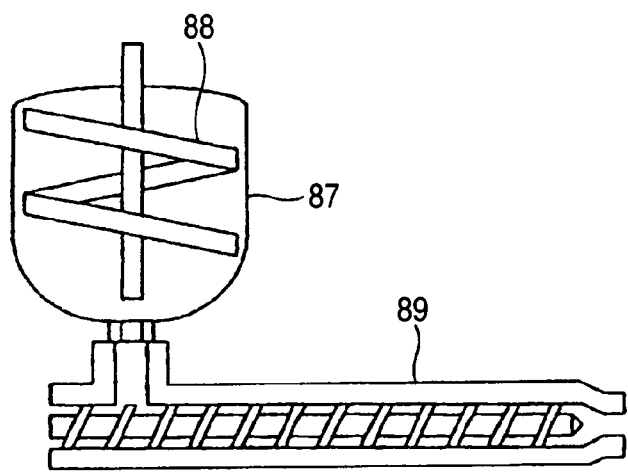
FIG. 10 An explanatory view of another example of a plasticizing part and a resin coating device.

Other embodiments are also possible. For example, as shown in FIG. 10, molten resin transport means such as a screw or a piston may be provided in a reactive pot or a reactor 87, and the may introduce the plasticized resin into the cylinder 89 of the above-mentioned injection molding machine after the resin is plasticized within the reactor 87.

The temperature for plasticizing the resin may be a temperature where the resin material can be melted.

Figure 11:
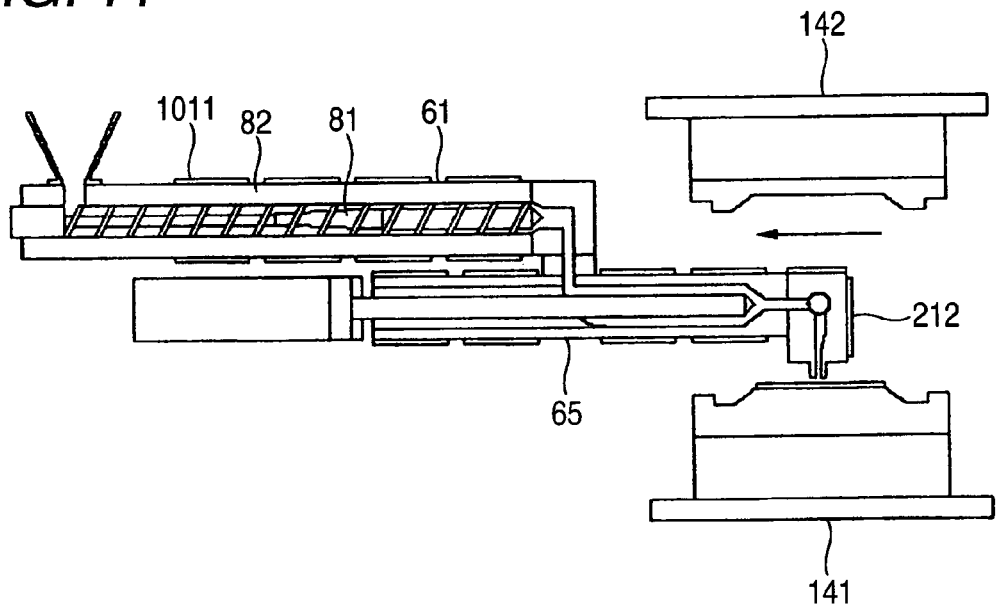
FIG. 11 An explanatory schematic sectional view of an example of a molded product manufacturing apparatus according to the invention.

As another embodiment, as shown in FIG. 11, it is also possible to employ a structure which is mainly composed of a plasticizing part 61 for melting and transporting a thermoplastic resin, a resin reserving part 65 connected to the plasticizing part 61 for injecting a poured molten resin (the detailed structure of which will be discussed later) in a predetermined feed rate, and a discharge part 212 for discharging the molten resin fed out from the resin reserving part 65 onto a resin coated surface from above.

The resin reserving part 65 may preferably be composed of a reserving cylinder which reserves once therein the poured molten resin and injects the molten resin in the predetermined feed rate.

Figure 12:
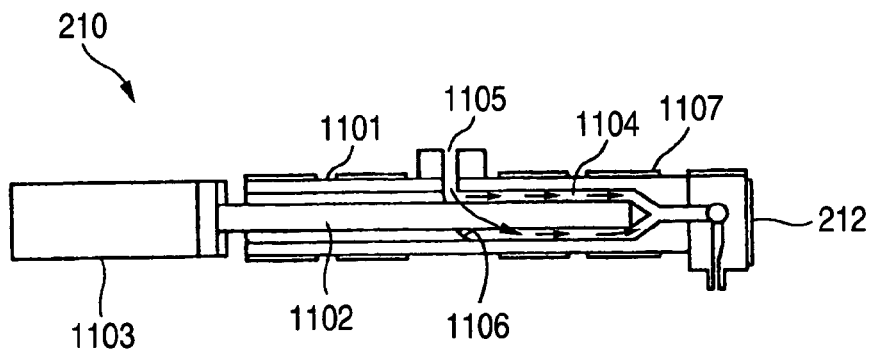
FIG. 12 An explanatory schematic sectional view of a reserving cylinder used in the invention.

FIG. 12 is an explanatory schematic sectional view of a reserving cylinder used in the present invention.

In FIG. 12, a reserving cylinder 210 comprises a cylinder 1101 having a cylindrical shape as a whole for reserving the molten resin therein, a piston 1102 provided within the cylinder 1101 for push and inject the molten resin in the predetermined feed rate, and piston drive means 1103 for moving the piston 1102 back and forth. Also, the reserving cylinder 210 further includes, in the outer peripheral portion thereof, means for heating and cooling the surface of the storing cylinder. As shown in FIG. 12, a clearance part 1104 through which the molten resin can pass is formed between the cylinder 1101 and piston 1102. When the molten resin flows from the plasticizing part 61 through an entrance port 1105, the molten resin is allowed to flow through the clearance part 1104 in the arrow mark direction. By setting the flow speed of the molten resin at a rather fast speed, the stagnation of the molten resin can be prevented. The size of the clearance part 1104 may be determined properly depending on the kinds of molten resin used, for example, it may be several mm or so, and, specifically, it may be in the range of 0.5 to 5 mm.

Figure 13:
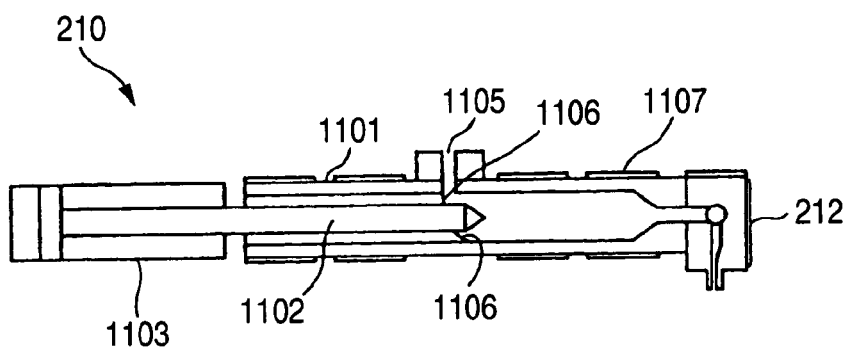
FIG. 13 An explanatory view of a reserving cylinder used in the invention, showing a state where a piston is moved backward.

Simultaneously with the inflow of the molten resin, the piston drive means 1103 is put to work so as to move the piston 1102 backward as shown in FIG. 13. Owing to this operation, the molten resin is gradually reserved in the cylinder 1101 starting from the leading end portion (discharge port side) of the cylinder 1101. When reserve of a predetermined amount of molten resin is completed, the piston drive means 1103 is operated to move the piston 1102 forward by a given distance, thereby being able to send out the molten resin at a predetermined feed rate. Incidentally, the position control of the piston 1102 must be made with relatively high accuracy.

Therefore, as the piston drive means 1103, there may be used a pressing force generating device such as a servomotor having a mechanism easy to secure accuracy.

According to the above-mentioned structure, the molten resin, which has flowed in first, is first fed and discharged out to the discharge part. This makes it possible to prevent the molten resin from degradation (transparent resin turns yellow (burnt) or dark brown (black spots)) due to the long residence time of the molten resin. Further, since the resin melting part and reserving cylinder 210 are connected together by a short path, the residence time of the molten resin can be reduced, thereby being able to prevent the occurrence of the thermal degradation of the molten resin more effectively. Incidentally, if a molded product is manufactured using the thermally degraded molten resin, there may be raised a problem that a desired optical transmittance or a desired refraction coefficient cannot be obtained when the molded product is used in an optical product.

Suppose the cylinder 1101 and piston 1102 are contacted with each other, there can be produced metal powder due to the friction between the two metal members, thereby raising a fear that the metal powder can have ill influences on the product. However, in the reserving cylinder 210 according to the invention, since the clearance part is formed 1104 between the cylinder 1101 and piston 1102, there is no possibility that such metal powder can be produced.

Also, as shown in FIGS. 12 and 13, in the reserving cylinder 210, there is provided a back flow preventive part 1106 which prevents the molten resin from flowing therethrough in order to prevent the molten resin, which has first flown into the cylinder 1101, from flowing into the opposite direction (toward the piston drive means 1103 side) to the leading end portion of the cylinder 1101. Incidentally, the back flow preventive part 1106 has a curved surface extending from the entrance port 1105 of the molten resin in the direction of the leading end portion of the cylinder 1101 such that the molten resin can be easily guided to the leading end portion of the cylinder 1101.

Further, according to the invention, preferably, a valve, which is capable to open and close the connecting flow passage, is provided in the connecting flow passage between the plasticizing part 61 and reserving cylinder 210.

Figure 14:
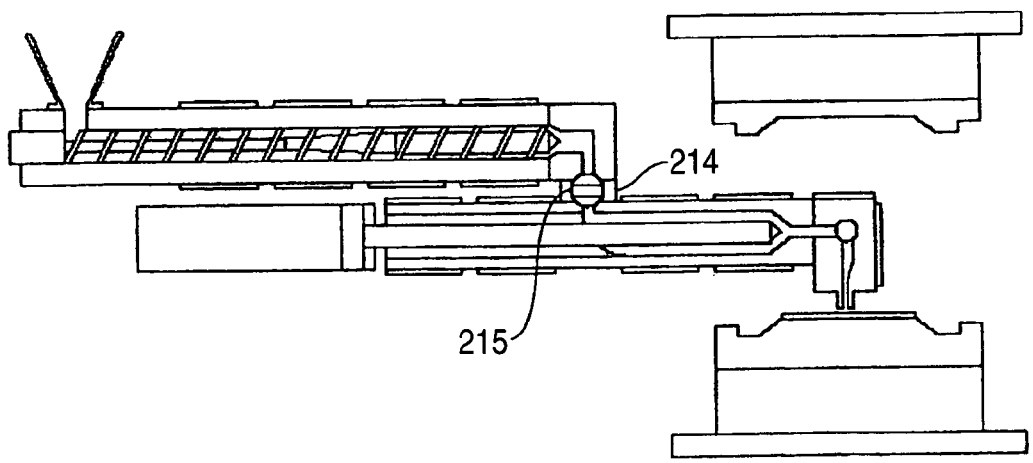
FIG. 14 An explanatory schematic sectional view of a molded product manufacturing apparatus according to the invention, showing an embodiment in which a valve is provided in a connecting flow passage between a resin melting part and a reserving cylinder.

FIG. 14 is a schematic sectional view of a molded product manufacturing apparatus, explaining a structure in which a valve is located in a connecting flow passage formed between the plasticizing part 61 and reserving cylinder 210. The molded product manufacturing apparatus shown in FIG. 14 is almost similar in structure to the molded product manufacturing apparatus shown in FIG. 11. However, it is different from the manufacturing apparatus shown in FIG. 11 in that a valve 215 is located in a connecting flow passage 214 between the plasticizing part 61 and reserving cylinder 61. As described above, after completion of the reserve of the molten resin within the cylinder 1101 of the reserving cylinder 210, the piston drive means 1103 is operated to move the piston 1102 forward by a given distance so as to inject the molten resin into the discharge part 212 in the predetermined feed rate. Here, the injecting amount of the molten resin is determined by the volume of the molded product. Therefore, in order to manufacture the molded product with high precision, it is necessary to reserve a controlled amount of the molten resin into the cylinder 1101 and also inject the controlled amount of the molten resin from the cylinder 1101. However, if a pressure difference occurs between the plasticizing part 61 and reserving cylinder 210 (normally, during the resin reserving time, the molten resin pressure of the plasticizing part 61 rises), the molten resin within the plasticizing part 61 is allowed to flow into the cylinder 1101 more than necessary and thus the amount of the molten resin flowing into the cylinder 1101 exceeds the predetermined amount. In such case, the excessive amount of the molten resin is reserved in the cylinder 1101, which makes it difficult to manufacture the molded product with high precision. To solve this problem, the valve 215 is located in the connecting flow passage 214 between the plasticizing part 61 and reserving cylinder 210, and the valve is closed to thereby cut off the flow of the molten resin from the plasticizing part 61 into the cylinder 1101 at the time when the reserve of the molten resin into the cylinder 1101 is completed. This makes it possible to reserve a predetermined amount of the molten resin.

Further, after completion of the reserve of the molten resin, the piston drive means 1103 is operated to move the piston 1102 forward by a given distance to thereby inject the molten resin into the discharge part 212 in the predetermined feed rate. In this case as well, preferably, the valve 215 may be left closed. By leaving the valve 215 closed, the injecting pressure of the molten resin due to the forward movement of the piston 1102 can be prevented from escaping to the plasticizing part 61 through the connecting flow passage 214. This makes it possible to inject the predetermined amount of the molten resin and inject the molten resin in the predetermined reed rate to the discharge part 212 in the predetermined feed rate. Accordingly, the molded product can be manufactured with high precision.

As the valve 215, there can be used any type of valve, provided that it can cut off the flow passage (connecting flow passage 214) of the molten resin and can control the inflow and outflow of the molten resin. For example, a well-known rotary valve can be used.

The discharge part 212 for discharging the molten resin fed out from the plasticizing part 61 onto the discharged surface from above is not limited to a specific discharge part. Preferably, there may be used such a discharge part that can deform the molten resin into a sheet (membrane) shape with high precision before it is discharged. Normally, the discharge part 212 is directly connected with the resin reserving part 65.

In the above-mentioned embodiment, as an example of the resin storing part 65, description has been given of the reserving cylinder 210 structured such that it once reserves the molten resin having flown therein and then injects the thus reserved molten resin in the predetermined amount and in the predetermined feed rate. However, the invention is not limited to this. For example, as the resin storing part 65, instead of the reserving cylinder 210, there can be used a cylinder having an injection function.

Figure 15:
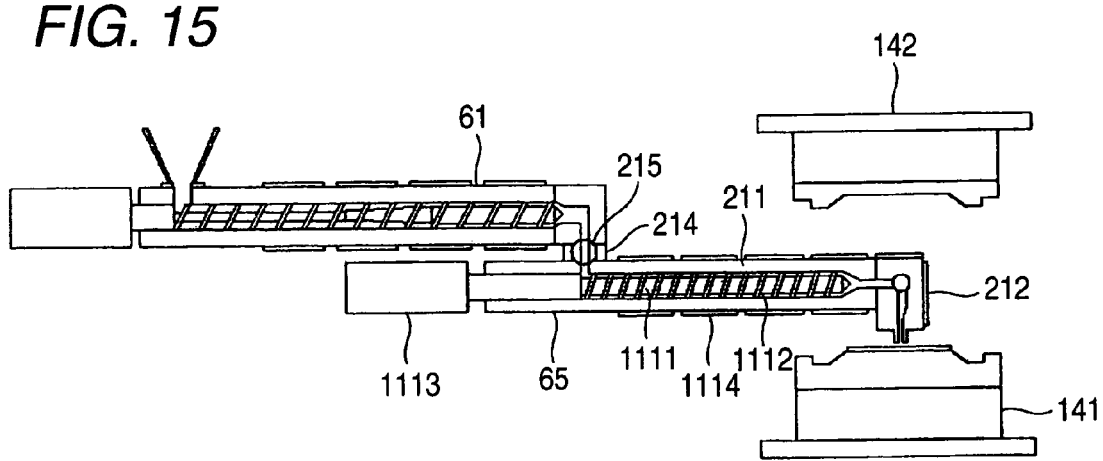
FIG. 15 An explanatory schematic sectional view of another embodiment of a molded product manufacturing apparatus according to the invention using a cylinder having an injection function as a resin injecting part.

FIG. 15 is an explanatory schematic sectional view of another embodiment of a molded product manufacturing apparatus according to the invention which uses a cylinder having an injection function as a resin injecting part.

The molded product manufacturing apparatus shown in FIG. 15, similarly to FIG. 11, is mainly composed of a plasticizing part 61 for melting a thermoplastic resin and transporting the molten resin, a resin reserving part 65 connected to the plasticizing part 61 for injecting the molten resin poured therein and a discharge part 212 for discharging the molten resin fed out from the resin reserving part 65 onto a resin coated surface from above. According to the present embodiment, as the resin reserving part, there is used a cylinder 211 having an injection function. As the cylinder 211, there can be used a cylinder which is produced for an injection molding machine; for example, a cylinder the whole of which has a cylindrical shape and also which includes a penetration inner hole 1112 with a screw 1111 contacted with the inner surface thereof. Also, the cylinder 211 further includes two or more heaters which are respectively mounted on the outer peripheral surface thereof. The screw 1111 is structured such that it can be rotated as well as can be moved back and forth by drive means 1113.

The molten resin from the plasticizing part 61 flows into the cylinder 211 from an entrance port 1114. The molten resin is then fed in the direction of the leading end portion of the cylinder 211 owing to the rotation of the screw 1111. After a predetermined amount of the molten resin is reserved in the leading end portion of the cylinder 211, the screw 1111 is moved forward according to a normally used method to thereby inject the molten resin to the discharge part 212 in the predetermined feed rate. Incidentally, similarly to the embodiment shown in FIG. 14, it may be preferable to provide a valve 215 in a connecting flow passage 214 between the plasticizing part 61 and cylinder 211, and close the valve 215 when the reserve of the molten resin into the cylinder 211 is completed so as to cut off the flow of the molten resin from the resin reserving part. This provides an effect that the reserve of the molten resin in the predetermined feed rate is possible. Further, after the reserve of the molten resin is completed, the molten resin is fed out to the discharge part 212 by the injection function of the cylinder 211 in the predetermined feed rate. Preferably, the valve 215 may be left closed at this time as well. This not only can prevent the injecting pressure of the molten resin from escaping through the connecting flow passage 214 to the plasticizing part 61, but also makes it possible to inject the molten resin to the discharge part 212 in the predetermined feed rate. Accordingly, the molded product can be manufactured with high precision.

As an embodiment of a resin coating device which is different from the above-mentioned embodiment, there can be pointed out a resin coating device which is disclosed in, for example, JP-A-2004-121986.

Figure 16:
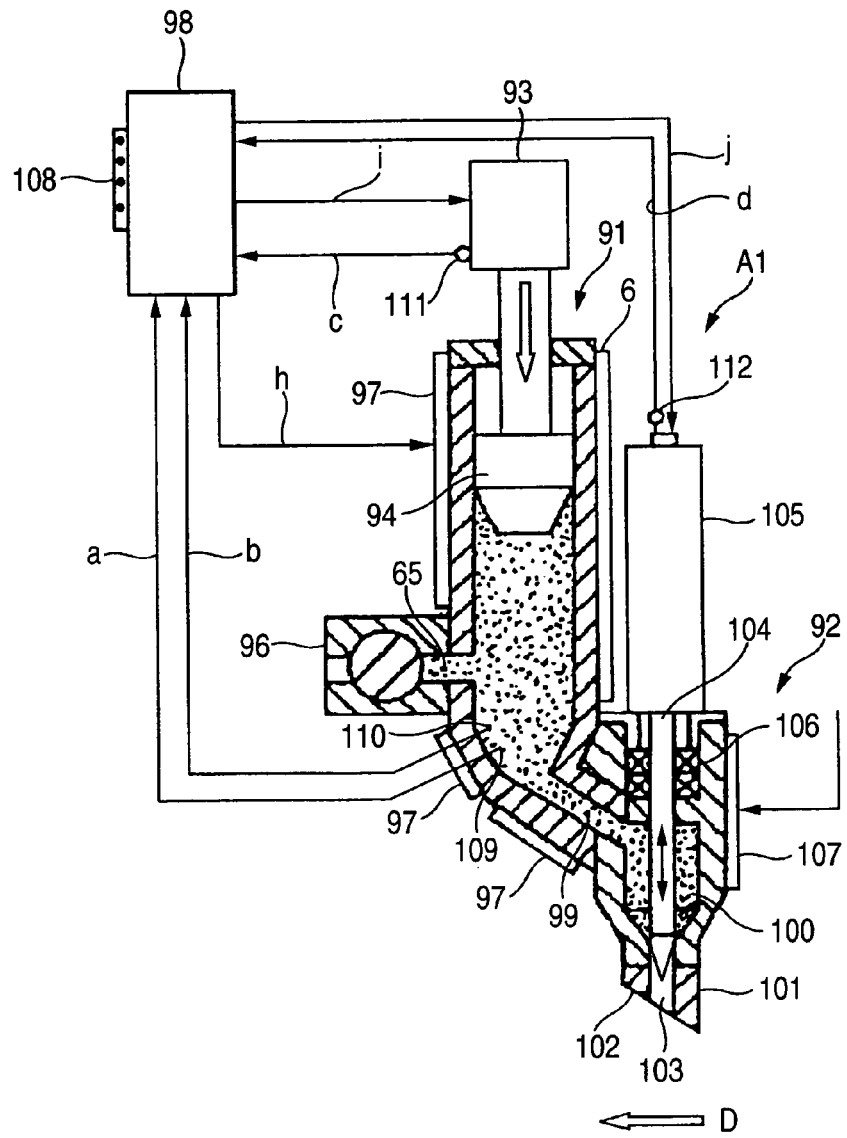
FIG. 16 An explanatory view of a resin coating device which can be used in the invention.

FIG. 16 is an explanatory view of an example of such resin coating device.

In FIG. 16, a resin coating device A1 is generally composed of a cylinder 91 functioning as a resin reserving part, and a resin coating part 92 which belongs to the cylinder 91 and is formed substantially integral with the cylinder 91. In the inside of the cylinder 91, there is located a piston 94 which can be driven in a vertical direction in FIG. 16 by a piston drive device 93. When the piston 94 is driven downward, the molten resin is pushed out through the resin coating part 92 to a metal mold. In the side portion of the cylinder 91, a resin supply passage 95 is opened up. In correspondence to the resin supply passage 95, there is provided a rotary valve 96 which is an example of means for opening and closing the resin supply passage 95. Incidentally, although not shown in FIG. 16, the above-mentioned plasticizing part for melting solid-state resin is provided in the present resin coating device A1, and the plasticized molten resin can be supplied through the rotary valve 96 to the cylinder 91. The push-out amount of the molten resin in the cylinder 91 is controlled very carefully depending on the drive speed of the piston 94. On the outer peripheral portion of the cylinder 91 structured in the above-mentioned manner, there are provided two or more heaters 97, 97, . . . as heat generating means. The quantities of heat generated by these heaters 97, 97, . . . are controlled by a control unit 98.

The lower end portion of the cylinder 91 is narrowed in a tapered manner to provide a resin passage 99 which is continuous with the resin coating part 92. The resin coating part 92 is composed of a resin adjusting portion 100 for allowing the molten resin to flow therethrough or for reserving the molten resin temporarily therein and a spatula portion 101 which is situated at the lower end of the resin adjusting portion 100. The lower end portion of the spatula portion 101 is cut off obliquely and can be thereby moved at a given speed in the arrow mark D direction. Since the inclined surface 102 of the spatula portion 101 is situated ahead in a moving direction, a discharge port 103 which functions as the exit of the molten resin is opened up in the inclined surface 102. In the present embodiment, the discharge port 103 is in communication with the resin adjusting portion 100. In the discharge port 103, there is located a needle 104 the leading end portion of which is reduced in diameter in a tapered manner. The upper end portion of the needle 104 is connected to the output shaft of a needle drive device 105 and is sealed by packing glands 106, 106. When the needle 104 is driven downward properly by the needle drive device 105, degrees of opening of the discharge port 103 can be adjusted. Incidentally, on the outer peripheral portion of the spatula portion 101 as well, there is located a heater 107 which functions as heat generating means. The amount of heat to be generated by the heater 107 is also controlled in the above-mentioned manner.

The control unit 98 also includes setting means 108 for setting the temperatures and pressures of the molten resin within the cylinder 91 and resin coating part 92, the driving speed of the piston 94, the degrees of opening of the discharge port 103, the moving speed of the resin coating device A1 in the resin coating operation thereof, and the like. The control unit 98, which has the above-mentioned function and includes the setting means 108, is connected by a signal line a to a resin pressure sensor 109 for measuring the pressure of the molten resin within the cylinder 91, is connected by a signal line b to a temperature sensor 110 composed of a thermocouple and the like for detecting the temperature of the molten resin, and is connected by a signal line c to a speed sensor 111 for detecting the driving speed of the piston 94, respectively.

Also, the control unit 98 is also connected to a needle position detect sensor 112 by a signal line d. Various kinds of measurement values measured by these sensors 109 to 112 are respectively input to the control unit 98 through their associated signal lines a to d, and are operated by the control unit 98. The manipulated value of the control unit 98 are respectively applied to the heaters 97, 97, . . . 107 through a power line h, to the piston drive device 93 through a power line i, and similarly to the needle drive device 105 through a power line j.

Next, description will be given below of a resin coating method using the molten resin coating device A1 according to the above-mentioned embodiment. The temperatures of the heaters 97, 97, . . . 107, the driving speed of the piston 94, the pressure of the molten resin, the opening degrees of the discharge port 103 and the like are set in the control unit 98 by the setting means. The rotary valve 96 is opened and the plasticized resin is supplied to the cylinder 91. Next, a resin coating operation is started. The piston 94 is driven, whereby the molten resin in the cylinder 91 maintained at a set temperature is fed to the resin adjusting portion 100 of the resin coating part 92 by a predetermined amount. The molten resin is then pushed up onto the metal mold by the needle 104 from the discharge port 103 kept at a given opening degree. Simultaneously with this, the spatula portion of the resin coating device A1 is moved in an arrow mark D direction. The thus pushed-out molten resin is extended onto the metal mold by the spatula portion 101. This completes the resin coating operation.

The discharge amount of the resin from the discharge port is controlled according to the coating width, coating thickness and coating speed of the molten resin (the speed at which the discharge port of the resin coating device moves on the metal mold) to the metal mold.

Figure 17:
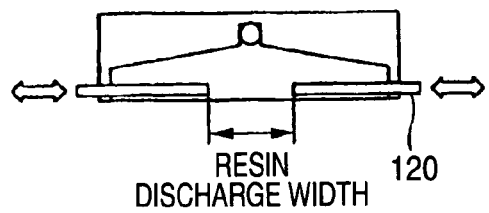
FIG. 17 Explanatory views of the shape of a discharge port which can be used in the invention.
Figure 17:
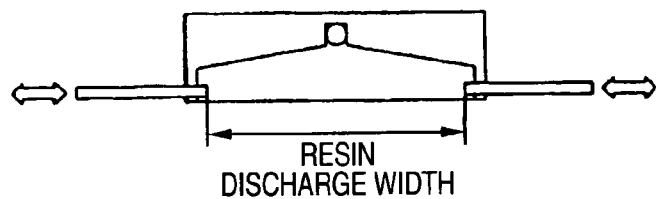

The discharge port, preferably, may have such a shape that the molten resin can be discharged in a slit manner in a direction substantially perpendicular to the resin coating direction. The discharge port is composed of one or more discharge ports which are connected together in a direction substantially perpendicular to the resin coating direction. In the case where two or more discharge ports are connected together, it is preferable to change a resin discharge width arbitrarily at the width pitches of the respective discharge ports by opening or closing switch valves respectively provided in the resin flow passages of the respective discharge ports. The widths and shapes of the respective discharge ports may be changed freely according to the shapes of the metal molds. Also, the number of discharge ports connected may be changed to thereby change the discharge width. Further, as shown in FIGS. 17(a) and 17(b), there may be additionally formed in the discharge port a gate 120 for changing the discharge width and the resin may be coated while changing the position of the gate 120 successively so as to provide a desired resin coated shape.

Figure 18:
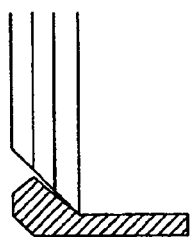
FIG. 18 Explanatory views of the shape of a discharge port which can be used in the invention.
Figure 18:
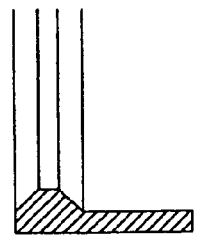
Figure 18:
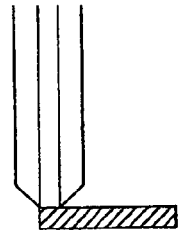

The discharge port spatula portion may have such a shape that a pouring gate in the obliquely cut-off lower end portion thereof is provided on the rear side in the resin coating advancing direction as shown in FIG. 18(a), or may have such a shape that two pouring gates are provided on both back and front sides in the resin coating advancing direction as shown in FIG. 18(b). To fill the molten resin into the minute uneven portion more efficiently using the discharge pressure, it is suitable to employ the latter shape in which the pouring gates are provided on both back and front sides in the resin coating advancing direction. Further, the discharge port spatula may also have such a shape that the leading end portion of the discharge port is formed in a tapered manner as shown in FIG. 18(c).

Incidentally, it is more preferable to provide pouring gates in the discharge port on the right and left sides as well in the advancing direction, whereby four pouring gates may be provided respectively on the right and left sides as well as on the back and front sides in the discharge ports. In this manner, there may be formed a substantially closed space between the leading end of the spatula portion of the discharge port and cavity surface, thereby providing a shape which makes it difficult for the discharge pressure to escape.

Figure 19:
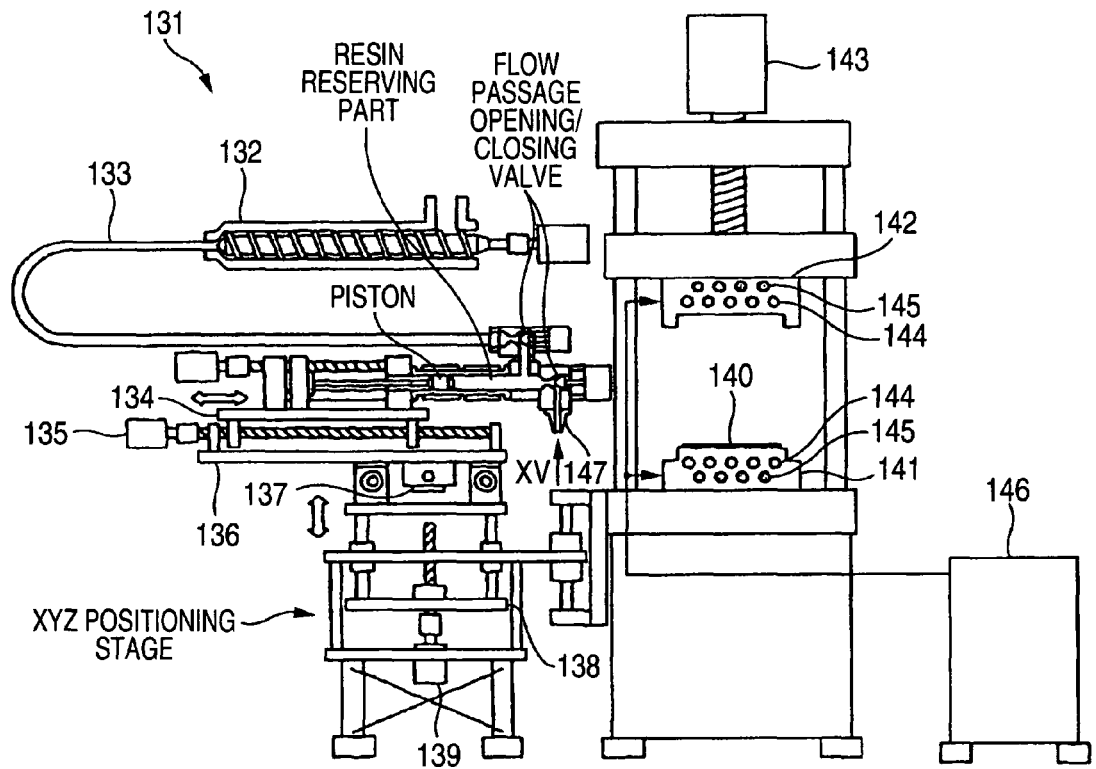
FIG. 19 An explanatory view of an example of a whole structure of a molded product manufacturing apparatus according to the invention.
Figure 20:
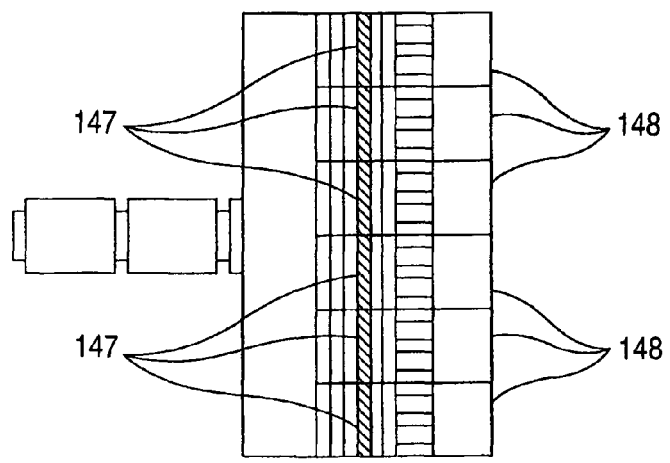
FIG. 20 An explanatory view of the shape of a discharge port which can be used in the invention.

FIG. 19 is an explanatory view of an embodiment of the whole structure of a molded product manufacturing apparatus according to the invention. According to the embodiment shown in FIG. 19, a resin coating device 131 is structured such that a plasticizing part 132 is released from the resin coating device 131, a flexible flow passage 133 connects the resin coating device 131 and the plasticizing part 132, and the molten resin is fed to the to the resin coating device 131 from the plasticizing part 132 through the connecting flow passage 133 (see FIG. 7). In the resin coating device 131, in order that it can be moved in the translating direction of the XYZ axes, there are provided a table 134 movable in the X axis direction (in the translating direction) and a drive motor 135 for driving the table 134, a table 136 movable in the Y axis direction and a drive motor 137 for driving the table 136, and a table 138 movable in the Z axis direction and a drive motor 139 for driving the table 138. As a forming plate, there is used a stamper 140 including a minute uneven portion on the surface thereof, while the stamper 140 is placed on a lower metal mold 141. This lower metal mold 141 and an upper metal mold 142 are respectively mounted on a precision pressing machine 143, while each of them includes metal mold heating means 144 composed of an electric heater and metal mold cooling means composed of temperature controlled water. Also, means for releasing a molded product from the mold is composed of a well-known mechanical ejector or air blower using mold releasing means drive device 146. Incidentally, the resin coating device 131 includes six-divided discharge ports 147 as shown in FIG. 20. The discharge quantities of the respective discharge ports 147 can be further adjusted by their associated flow passage opening/closing valve driving cylinders 148 (in FIG. 19, they are shown by the arrow mark XV).

Incidentally, the control of the temperature of the flexible flow passage, the control of the temperatures of the cylinder and discharge ports of the resin coating device, the control of the temperatures of the upper and lower metal molds, the opening and closing control of the valves for opening and closing the flexible flow passage and the resin flow passage of the resin coating device, the opening and closing control of the valves for opening and closing the multiple divided discharge ports, the control of the operation for moving the XYZ axes tables and pistons of the resin coating device at desired positions and speed, the control of the mold opening and closing operation (the position, speed and pressure) of the pressing machine, and similar control are respectively executed by a control unit (not shown).

Incidentally, the resin coating device according to the embodiment shown in FIG. 19 is mounted on the XYZ table and has a cantilevered structure that the rear side of the resin coating device is fastened to a stage. Preferably, in the resin coating step, in order to prevent the discharge part 212 from being flexed in the vertical direction due to the reaction against the discharge of the molten resin, the discharge part 212 of the resin coating device may be moved while it is being supported by a highly rigid guide and may discharge the molten resin.

Figure 21:
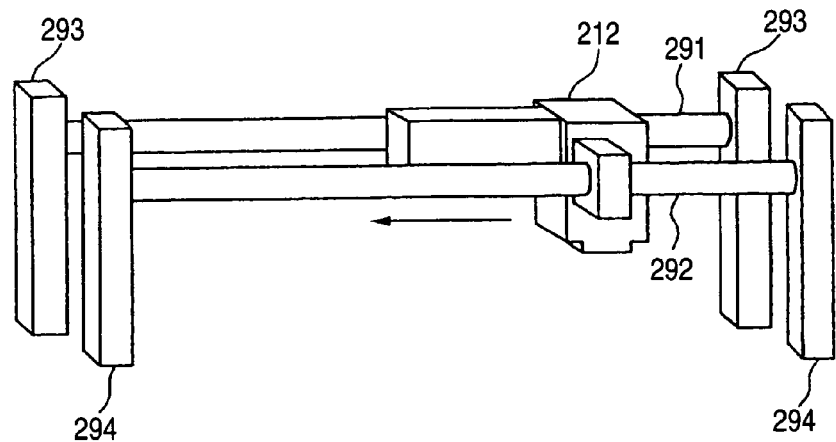
FIG. 21 An explanatory view of a step of discharging molten resin from a discharge part which moves while it is supported by a highly rigid guide.

FIG. 21 is an explanatory view of a step of discharging the molten resin from the discharge part 212 to be moved while it is being supported by a highly rigid guide.

In FIG. 21, the two sides of the discharge part 212 are supported by at least two highly rigid guides 291, 292 which are respectively provided along the coating direction of the molten resin. The highly rigid guides 291, 292 are respectively fixed by two or more support members 293, 294 which are respectively located on the upstream and downstream sides in the coating direction of the molten resin. When discharging the molten resin from the discharge part 212, the discharge part 212 moves in an arrow mark direction along the highly rigid guides 291, 292 as shown in FIG. 21 and discharges the molten resin. Accordingly, without the discharge part 212 being flexed in the vertical direction due to the reaction against the discharge of the molten resin, the discharge part 212 can discharge the molten resin in a preset thickness.

The highly rigid guides 291, 292 may be made of any material, provided that it can prevent the discharge part 212 from being flexed in the vertical direction due to the reaction against the discharge of the molten resin. For example, they may be made of stainless steel.

Figure 22:
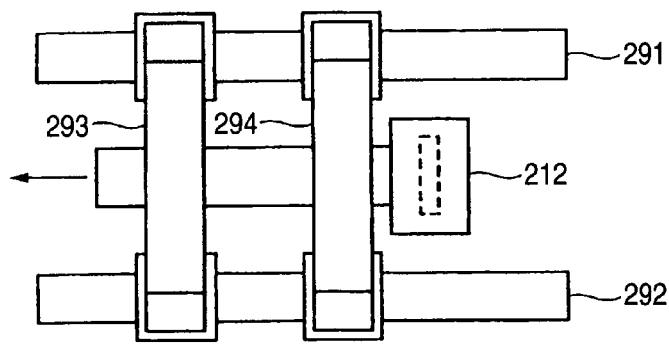
FIG. 22 Explanatory views of another embodiment of the step of discharging molten resin from a discharge part which moves while it is supported by a highly rigid guide.
Figure 22:
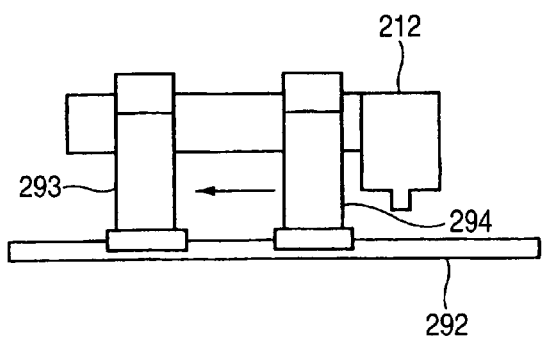
Figure 22:
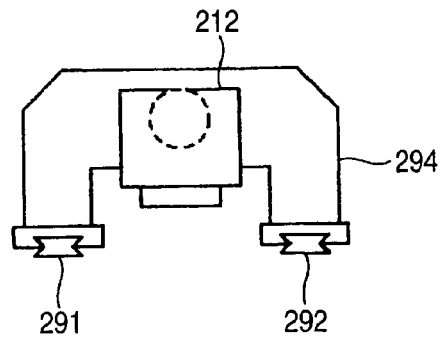

As a method for supporting the discharge part 212, besides the method for supporting the discharge part 212 by at least two highly rigid guides 291, 292 shown in FIG. 21, there can also be employed such a method as shown in FIG. 22 in which the discharge part 212 is supported by two guide rails. The discharge part 212 may be supported by at least one guide rail using a guide rail having a wide width. Specifically, the discharge part 212 is moved while it is being supported by two highly rigid guides (guide rails) 291 and 292 using a linear guide bearing. In FIG. 22, the discharge part 212 is supported by two highly rigid guides 291 and 292 respectively located along the coating direction of the molten resin through support members 293 and 294, and the highly rigid guides 291 and 292 are respectively fixed to the main body of the molded product manufacturing apparatus on which the resin coating device is mounted. Here, FIG. 22(a) is a top plan view of the resin coating device, FIG. 22(b) is a front view of the resin coating device, and FIG. 22(c) is a side view of the resin coating device. As a method for fixing the highly rigid guides, there can be used any method. For example, a method for fastening (screwing) the highly rigid guides to a bed, which is provided in the apparatus main body, can be used.

Incidentally, in the embodiment shown in FIG. 19, the lower metal mold 141 includes a projecting portion, and the stamper 140, which includes a minute uneven portion, is mounted on the surface of the projecting portion. Thus, in order to move the leading end lip portion 284 of the discharge part 212 along the shapes of the lower metal mold 141 and stamper 140, preferably, there may be provided moving means for moving the lower metal mold 141 in a vertical direction, and the distance between the leading end lip portion 284 of the discharge part 212 and stamper 140 may be adjusted. When compared with a large-scale apparatus structure for moving the discharge part, plasticizing part and resin coating device in the vertical direction, according to the present embodiment, a role for the vertical movement is played by the metal mold. Thus, a fast vertical operation is possible, the moving speed of the discharge part 212 can be enhanced, thereby being able to improve the productivity of the present molded product manufacturing apparatus.

Figure 23:
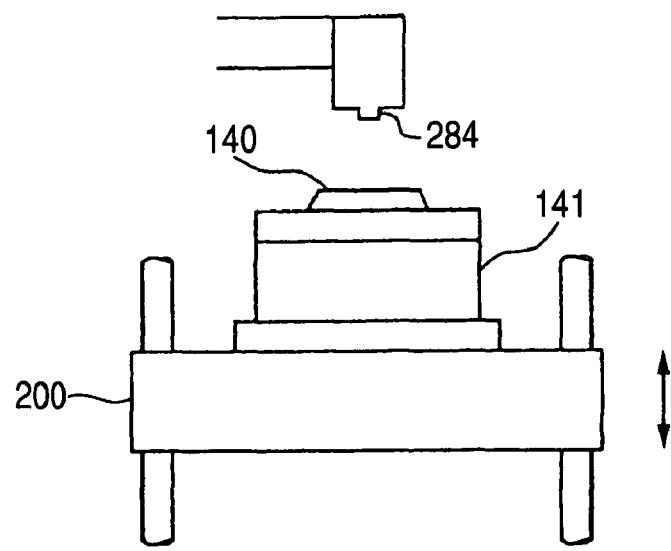
FIG. 23 An explanatory view of an example of means for moving a lower metal mold in the vertical direction.

Specifically, there can be employed such a method as shown in FIG. 23. In this method, the lower metal mold 141 is set in such a manner as shown in FIG. 23. A platen of a pressing machine 200 having the pressurizing function of a pair of upper and lower metal molds is used as moving means. By moving the platen 200 in the vertical direction, the distance between the leading end lip portion 284 of the discharge part 212 and stamper 140 can be adjusted.

Figure 24:
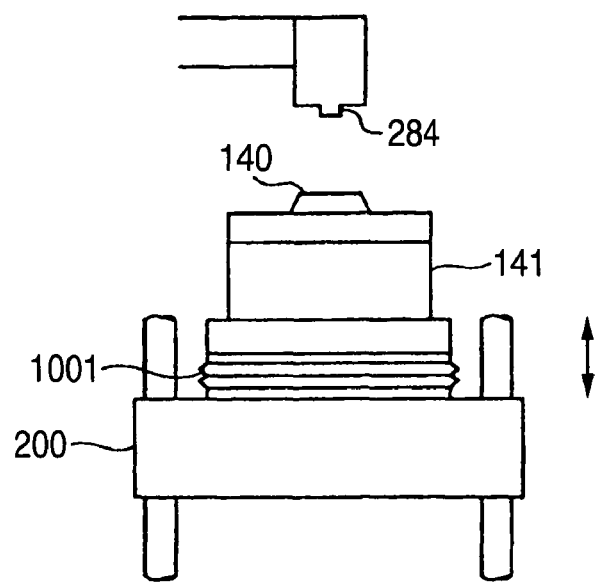
FIG. 24 An explanatory view of another example of means for moving a lower metal mold in the vertical direction.

Also, there can also be employed such a method as shown in FIG. 24. In this method, between a platen of a pressing machine 200 functioning as moving means and a lower metal mold 141, there is interposed a vertically movable stage 1001, and a distance between the leading end lip portion 284 of the discharge part 212 and stamper 140 can be adjusted by moving the vertically movable stage 1001 in the vertical direction.

Figure 25:
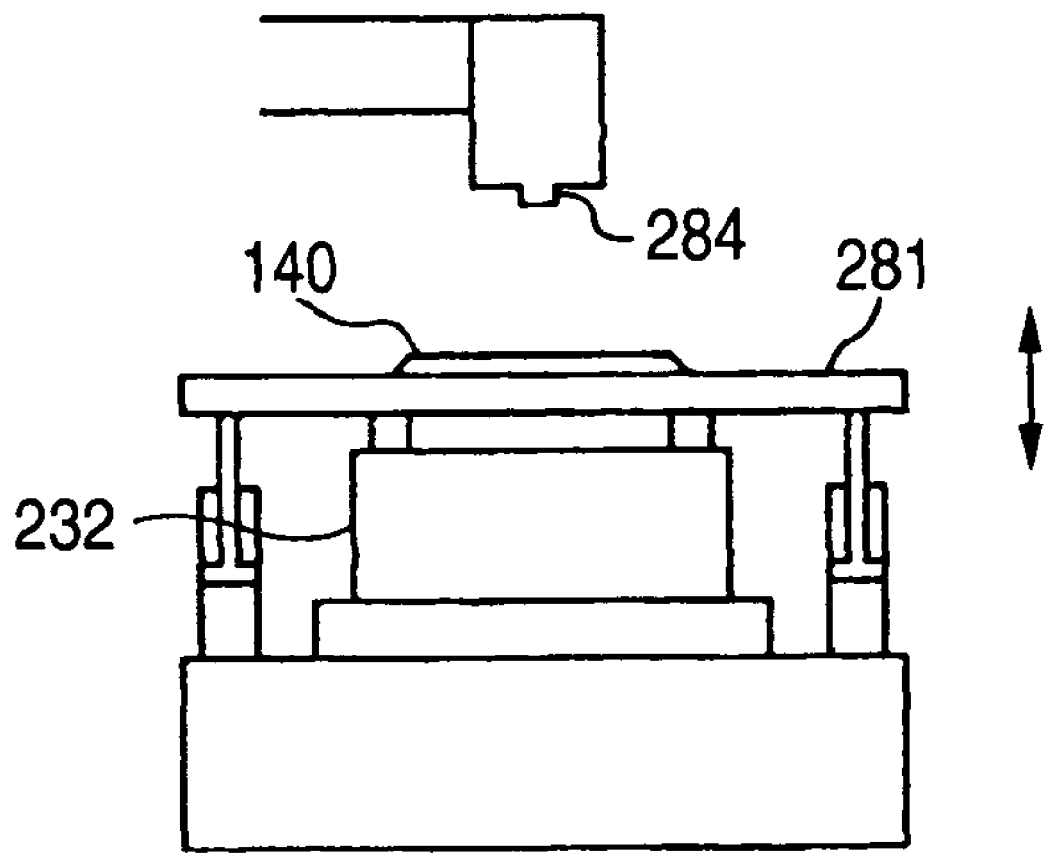
FIG. 25 An explanatory view of still another example of means for moving a lower metal mold in the vertical direction.

Further, there can also be employed such a method as shown in FIG. 25. In this method, a lower metal mold 232 and a metal mold 281 are structured such that they can be released from each other, only the metal mold 281 can be moved in the vertical direction, and the distance between the leading end lip portion 284 of the discharge part 212 and stamper 140 can be adjusted by moving the metal mold in the vertical direction.

Incidentally, as the above-mentioned moving means, there may be used various kinds of actuators. According to the above-mentioned embodiments, the molten resin can be discharged onto the stamper 140 in a three-dimensional geometry, and the coating thickness of the molten resin to the stamper 140 can be changed easily.

According to the invention, a molded product, which has the precise microstructure and also which has high dimensional precision, low residual stress, low birefringence, high optical-transparency and excellent mechanical strength, can be provided in a three dimensional geometry, thin wall and large-area according to a very low molding pressure molding process. The present molded product can be used suitably in various industrial products, for example: (a) key parts in the electronic display field such as micro-lens array, a light guide plate for liquid crystal display, a flexible display substrate, a wave plate, a reflecting plate, a phase difference plate, a free curved-surface mirror, an LED light emitting panel, a Fresnel lens, and the like; (b) key parts in the optical information communication field such as a flexible polymer optical waveguide, a free curved-surface diffraction grating, a two-dimensional image sensor array, a pickup lens, a hologram, a flexible waveguide type illuminating plate; (c) key parts in the optical recording medium field such as an up-coming-generation DVD (a blue ray disk), a cover layer for a blue ray disk, a DVD, an ultra-thin IC card and the like; (d) key parts in the life science field such as an integrated chemical chip, a DNA chip, a bio-chip, a protein chip, a micro fluid device, an environmental analysis chip and the like; and (e) key parts in the new energy field such as a fuel cell separator, a cellular phone ultra-thin battery case, a solar light condensing Fresnel lens and the like.

Now, description will be given below in more detail of the invention with reference to the embodiments thereof.

EMBODIMENT 1

A molded product is manufactured using the following molded product manufacturing apparatus.

[Resin Coating Device]

Discharge port shape: length 30 mm×width 1 mm. A shape shown in FIG. 18(c).

Extruding and pressurizing mechanism: piston.

Piston diameter: φ10 mm.

Freedom of movement of resin coating device: 1-degree freedom (the back-and-forth movement in the resin coating direction)

Drive system: The rotation of a servomotor is converted to a linear movement by a ball screw to thereby move the resin coating device and piston.

Resin heating means: an electric heater wound around the outer periphery of a cylinder. A discharge part uses a plate-shaped electric heater.

[Forming Mold]

Material: stainless steel (SUS304).

Cavity area: 30 mm×50 mm. However, the edge portion of the metal mold has a step.

Heating source: a built-in cartridge heater.

Cooling source: temperature controlled water is made to flow through a medium flow hole.

[Press]

Maximum clamping force: 10t.

Set clamping force: 1.2t.

[Resin Material]

Material: polymethyl methacrylate

Manufacturer: Kuraray Co., Ltd.

Brand: Parapet GH1000S

Melting viscosity at 250° C.: about 800 Pa·s.

After the upper and lower metal molds were heated at a set temperature of 200° C., polymethyl methacrylate, which had been heated and dried preliminarily at a temperature of 90° C. for four hours, was put into the heating cylinder of the resin coating device and was then plasticized there. The temperature of the heating cylinder was set at a temperature of 250° C. The molten resin was coated onto a stamper set on the lower metal mold using the resin coating device. The coating speed of the resin coating device was set for 100 mm/sec, and the coating thickness of the resin was set for 80 μm. After then, the coated molten resin was pressed with the clamping force of 1.2 ton (the minimum clamping force that can be set).

While the clamping force was left applied, water was allowed to flow through the upper and lower metal molds to cool them down to a temperature of about 60° C. After then, the metal mold was opened and the molded product was released from the stamper.

The stamper has a rectangular shape the length of which is 30 mm and the width of which is 50 mm, and also the stamper has a thickness of 0.3 mm. The stamper was set on the cavity surface of the metal mold. However, the stamper has a step on the edge portion thereof. In this case, there was obtained a molded product having a shape which faithfully follows the shapes of the stamper and metal mold cavity.

Since the minimum clamping force of the pressing machine was 1.2 ton, a value (=pressing pressure) obtained by dividing the clamping force by the projection area of the molded product is 80 kg/cm$^2$.

A value, which is obtained by dividing a longitudinal-direction length 50 mm of the molded product by the membrane thickness 80 μm, is 625. When polymethyl methacrylate is molded according to an injection molding method, it is generally said that, when a value obtained by dividing the flow length (the longitudinal-direction distance of the molded product) by the thickness exceeds 130, it is difficult to mold the polymethyl methacrylate. However, according to the present embodiment, a molded product difficult to be molded according to the injection molding method could be obtained with a low pressure equal to or less than 80 kg/cm$^2$.

EMBODIMENT 2

Using the structure of the molded product manufacturing apparatus according to the embodiment 1, the below-mentioned stamper was mounted on the mold cavity surface and a molded product having a Y-shaped minute flow passage was manufactured.

[Stamper]
Material: nickel
Minute uneven shape: Y-shaped minute flow passage having a section surface of a width 50 μm×a height 50 μm.
Stamper shape: It has a rectangular shape of a length 30 mm and a width 50 mm and also it has a thickness 0.3 mm (it includes the above-mentioned minute uneven shape).

Incidentally, the coating thickness of the resin coated onto the stamper set in the central portion of the cavity was set for 250 μm.

The enlarged picture of the terminal end portion of the Y-shaped flow passage shows that there was formed a flow passage having a clear edge, and also that the shape transcribe condition was also good.

Since the minimum set clamping force of the pressing machine was 1.2 ton, a value (=clamping force) obtained by dividing the clamping force by the projection area of the molded product is 80 kg/cm$^2$.

A value, which is obtained by dividing the longitudinal-direction length 50 mm of the molded product by the membrane thickness 250 μm, is 200.

According to the present embodiment, without damaging the uneven shape of the stamper, there could be obtained a molded product having a good transcribed shape with a low pressure of 80 kg/cm$^2$.

EMBODIMENT 3

A molded product was manufactured using the molded product manufacturing apparatus shown in FIG. 19.

As the plasticizing part 132, there was used a single screw extruder, and the above-mentioned polymethyl methacrylate was plasticized at a temperature of 250° C. The molten resin discharge part of the plasticizing part 132 and the molten resin pouring part of the resin coating device 131 were connected together by the flexible flow passage 133. In the molten resin pouring part of the resin coating device 131, there is additionally provided a valve for opening and closing a molten resin flow passage which connects together the flow passage 133 and the resin reserving part of the resin coating device 131.

The resin coating device 131 includes a resin reserving part (a heating cylinder), a piston functioning as an extruding and pressurizing mechanism, a discharge port 147 shown in FIG. 19 for discharging the molten resin reserved in the resin reserving part, and valves for opening and closing the molten resin flow passages respectively connecting the resin reserving part to the two or more divided discharge ports 147. The resin coating device 131 is mounted on a table movable in the translation direction of the XYZ axes and is fastened to a precision pressing machine in such a manner that it can be moved in the vertical direction. Incidentally, the shape of one of the discharge ports 147 is the shape shown in FIG. 18(c) which has a length of 50 mm and a width of 1 mm.

The upper metal mold 142 to be mounted on the pressing machine can be heated by the mold heating means 144 composed of an electric heater and also can be cooled by the metal mold cooling means 145 composed of temperature controlled water. As means for releasing the molded product from the metal mold, there are provided a mechanical ejector and an air blower which use the well-known mold releasing means drive device 146.

The area of the cavity of the lower metal mold 141 was set for 250 mm×250 mm. The maximum clamping force of the pressing machine is 20 t. The material used here is the above-mentioned polymethyl methacrylate.

The manufacturing process of the molded product according to the present embodiment is as follows. Incidentally, the raising of the temperature of the resin coating device, the raising of the temperature of the flexible flow passage that can be heated, and the raising of the temperature of the plasticizing device have been previously completed.

Also, the setting of control systems relating to the respective operations of the plasticizing device, resin coating device, pressing machine and the like as well as the setting of a control system relating to the sequence operation for operating them sequentially according to the manufacturing process have also been completed.

(1) Temperature Raising Step

The temperatures of the upper and lower metal molds are raised up to a temperature of 150° C.

(2) Step of Filling the Molten Resin into the Resin Coating Device

The screw of the plasticizing part is rotated, the resin is plasticized, the valve for opening and closing the molten resin flow passage connecting together the present flow passage and the resin reserving part of the resin coating device is opened, and the molten resin is supplied into the resin coating device. At the time when a desired amount of molten resin is reserved in the resin coating device, the operation of the plasticizing part is stopped, and the valve for opening and closing the molten resin flow passage is closed at the same time. As for the amount of the molten resin reserved, a required amount of molten resin is calculated according to the width of the molten resin coated (the number of discharge part valves to be opened during the resin coating), the distance of the molten resin to be coated, and the thickness of the molten resin to be coated.

(3) Resin Coating Step

The resin coating patterns of the resin coating device (the moving path (position) of the discharge part, the moving speed thereof, and the opening and closing of the discharge part valves) are previously given to the resin coating device as instruction values. In a state where the metal mold is opened, the discharge port is moved to the resin coating start position of the cavity surface of the lower metal mold. The resin coating operation is started according to a resin coating start instruction. The table movable in the translation direction of the XYZ axes, the piston of the resin coating device, and the flow passage opening and closing valve set in the discharge part of the resin coating device are operated in linking with one another, whereby the molten resin is coated in such a manner as to follow the shape of the cavity surface of the lower metal mold.

According to the present embodiment, since the height of the minute uneven portion is 50 μm, a metal mold having a height of about 100 μm higher than 50 μm is opened.

(4) Compressing Step

After completion of the resin coating, the pressing machine is operated to fit the upper and lower metal molds with each other, thereby pressing the molten resin. As a result, the shape of the molded product is arranged. The maximum clamping force applied in the compressing step according to the present embodiment is 15$t$.

(5) Cooling Step

In order to compensate the volume shrinkage of the molten resin involved with the cooling of the molten resin, while a clamping force (in the present embodiment, 10 t) is left applied, the heater of the metal mold is turned off and temperature controlled water is applied into the metal mold to thereby cool it down to a desired temperature.

(6) Mold Unfastening Step

According to the present embodiment, since the resin is coated in a thickness of 0.5 mm, the metal mold is opened about 0.2 mm.

(7) First Releasing Step

The lower surface of the molded product is released from the cavity surface of the lower metal mold using a mechanical ejector or an air blower mechanism mounted on the lower metal mold.

(8) Second Releasing Step

The entire surface of the molded product is released from the other cavity surface than the cavity surface released in the (7) step using a mechanical ejector or an air blower mechanism mounted on the metal mold.

(9) Mold Opening Step

The metal mold is opened to such a distance that the molded product can be removed.

(10) Molded Product Removing Step

The molded product is removed from the metal mold.

As a result of manufacture of a molded product according to the above-mentioned method, there was obtained a molded product having a shape of a length 250 mm, a width 250 mm and a thickness 0.5 mm.

The cavity surface includes a portion which is mirror finished and a portion which is set in the vicinity of the central portion of the cavity surface, in which a mechanical working trace was intentionally left, and on which a stamper was mounted. Further, in the leading end portion of the ejector, there is left a slight mechanical working trace. Incidentally, the mechanical working trace intentionally formed in the stamper mounted portion has a minute uneven shape the width and depth of which are respectively about 45 μm. Also, the mechanical working trace of the leading end portion of the ejector has a minute uneven shape the width and depth of which are respectively about 50 μm.

It has been confirmed that the mechanical working traces of the stamper portion and ejector portion have been accurately transcribed to the molded product obtained according to the present embodiment.

This confirmation is also attained similarly in a molded product manufactured according to another method in which the resin is not pressed, but, after completion of a resin coating step, the resin is solidified and the molded product is then released from the metal mold.

The maximum pressure in the manufacturing process, which can be calculated from the maximum pressing force applied in the compressing step, is 24 kg/cm$^2$ (2.35 MPa).

From the foregoing embodiments, it has been confirmed that the molded product manufacturing method and apparatus according to the invention can provide a molded product to which a required shape has been transcribed accurately with a very low molding pressure.

Although description has been given heretofore in detail of the invention with reference to the specific embodiments thereof, it is obvious to a person skilled in the art that various changes and modifications are also possible without departing from the spirit and scope of the present invention.

The present application is based on the Japanese patent application (Japanese Patent Application No. 2004-239567) filed on Aug. 19$^{th}$, 2004 and the contents thereof are incorporated into the present application for reference.

INDUSTRIAL APPLICABILITY

According to the invention, there are provided molded product manufacturing method and apparatus in which a molded product having precise microstructure, high dimensional precision, low residual stress, low birefringence, high optical-transparency, and excellent mechanical strength can be provided in a three dimensional geometry, thin wall and large-area by a very low molding pressure molding process.

The invention claimed is:

1. A method for manufacturing molded products, comprising:
    a resin coating step of coating a molten thermoplastic resin onto a metal mold having a minute uneven portion on a surface thereof;
    a compressing step of compressing the coating of molten thermoplastic resin against the metal mold thereby producing a shape of a final molded product; and
    a solidifying step of solidifying the coating of molten thermoplastic resin by cooling the coating of molten thermoplastic resin;
    wherein the resin coating step further includes:
    supplying the molten thermoplastic resin to a resin coating device including a discharge port;
    discharging the molten thermoplastic resin onto the minute uneven portion from above while moving the resin coating device, wherein the distance between a distal end of the discharge port and the metal mold is equal to a thickness of the coating of the molten thermoplastic resin on the metal mold;
    wherein a discharge pressure of the resin coating device causes the molten thermoplastic resin to fill the minute uneven portion and pushes out air from between the thermoplastic resin and the minute uneven portion on the mold;
    filling the molten thermoplastic resin into the minute uneven portion such that the thermoplastic resin has a shape and a thickness that is substantially the same as a shape and a thickness of the final molded product; and heating the metal mold such that the thermoplastic resin is capable of adhering to the minute uneven portion;

wherein the molten thermoplastic resin is compressed by a pressure no greater than 80 kg/cm$^2$.

2. The method for manufacturing molded products according to claim 1, wherein the solidifying step is a step of cooling and solidifying the molten thermoplastic resin while applying a pressing force thereto.

3. The method for manufacturing molded products according to claim 1, wherein the resin coating device is movable up to 6 degrees of freedom such that the molten thermoplastic resin is filled into a whole minute uneven portion from the discharge port of the resin coating device.

4. The method for manufacturing molded products according to claim 1, wherein the minute uneven portion has a width or a diameter of 10 nm to 1 mm and has a depth or a height of 10 nm to 1 mm.

5. The method for manufacturing molded products according to claim 1, wherein a thickness of the molded product is in a range of 50 μm to 5 mm.

6. The method for manufacturing molded products according to claim 1, wherein the metal mold comprises an upper metal mold and a lower metal mold, and wherein at least one of the upper metal mold and the lower metal mold include a minute uneven portion.

7. The method for manufacturing molded products according to claim 1, further comprising a series of following steps (a) to (i):

(a) a metal mold temperature raising step comprising:

preparing an upper metal mold and a lower metal mold;

raising a temperature of a cavity surface of the upper metal mold up to a temperature which is capable of maintaining a softened state of the thermoplastic resin contacted with the cavity surface of the upper metal mold such that, in a below-mentioned compressing step, the thermoplastic resin can be deformed so as to follow the shape of the cavity surface of the upper metal mold under a pressing force applied thereto without forming a frozen layer on the surface of the thermoplastic resin; and raising a temperature of the cavity surface of the lower metal mold up to a temperature such that a discharged thermoplastic resin in a below-mentioned resin coating step is capable of adhesion to the minute uneven portion;

(b) a resin coating step comprising:

discharging the thermoplastic resin from the discharge port of the resin coating device while moving the resin coating device in such a manner that the thermoplastic resin is filled onto a whole minute uneven portion; and coating the thermoplastic resin until it forms substantially the same shape as the final shape of the final molded products;

(c) a compressing step comprising:

fitting the upper metal mold and the lower metal mold with each other;

compressing the coated thermoplastic resin intervening between the cavity surface of the lower metal mold and the cavity surface of the upper metal mold by using a pressing force generating device; and arranging a shape of the thermoplastic resin into a shape of a closed space formed between the closed cavities;

(d) a solidifying step of solidifying the thermoplastic resin by cooling the thermoplastic resin down to a desired temperature while applying the pressing force to the thermoplastic resin;

(e) a mold unfastening step of opening the upper metal mold and the lower metal mold by a small amount within a range where the upper metal mold and the lower metal mold are mutually fitted with each other;

(f) a first releasing step of releasing one of the cavity surfaces of the upper metal mold and the lower metal mold from the molded product by using a mold releasing device installed on the metal mold;

(g) a second releasing step of releasing the other cavity surface than the cavity surface released in the (f) step from the molded product by using the releasing device installed on the metal mold;

(h) a mold opening step of opening the metal mold to a distance such that the molded product is capable of being removed from the metal mold; and (i) a molded product removing step of removing the molded product from the metal mold.

8. The method for manufacturing molded products according to claim 7, wherein the (c) step includes:

sucking an air in a minute clearance, which is formed between the cavity surface of the upper metal mold and a top surface of the thermoplastic resin in a state where the upper metal mold and the lower metal mold are fitted with each other, so as to provide a pressure reduced state or a substantially vacuum state;

contacting the cavity surface of the upper metal mold and the top surface of the thermoplastic resin with each other; and applying a pressing force to the thermoplastic resin.

9. An apparatus for manufacturing molded products, comprising:

a metal mold which includes a minute uneven portion on a surface thereof;

heating means which heats the metal mold;

cooling means which cools the metal mold;

a resin coating device which fills a molten thermoplastic resin into the minute uneven portion;

wherein the resin coating device includes:

a plasticizing part which plasticizes a thermoplastic resin into a molten state;

a resin reserving part which reserves the molten thermoplastic resin therein; and a discharge port which discharges the molten thermoplastic resin therefrom, and wherein the resin coating device is movable in such a manner that the molten thermoplastic resin is discharged from the discharge port onto the minute uneven portion from above such that the molten thermoplastic resin has a shape and a thickness that is substantially the same as a shape and a thickness of a molded product;

wherein a discharge pressure of the resin coating device causes the molten thermoplastic resin to fill the minute uneven portion and pushes out air from between the thermoplastic resin and the minute uneven portion on the mold;

wherein the resin coating device is moveable such that a distance between a distal end of the discharge port and the metal mold is equal to a thickness of the molten thermoplastic resin after the molten thermoplastic resin is discharged onto the metal mold; and wherein the heating means is configured to heat the metal mold such that the thermoplastic resin is capable of adhesion to the minute uneven portion; and a pressing machine for compressing the molten resin on the metal mold, wherein the pressing machine is configured to compress the molten thermoplastic resin by a pressure no greater than 80 kg/cm$^2$.

10. The apparatus for manufacturing molded products according to claim 9,
wherein the resin coating device is movable up to 6 degrees of freedom.

11. The apparatus for manufacturing molded products according to claim 9,
wherein the distal end of the discharge port has a tapered shape.

12. The apparatus for manufacturing molded products according to claim 9,
wherein the discharge port includes a pouring gate at least on one of back and front sides in the resin coating device moving direction.

13. The apparatus for manufacturing molded products according to claim 9,
wherein the resin reserving part is a reserving cylinder which once reserves a flown molten resin and injects the molten resin in a predetermined feed rate.

14. The apparatus for manufacturing molded products according to claim 13,
wherein the reserving cylinder includes:
a cylinder which reserves the molten resin;
a piston which is located in the cylinder and injects the molten resin; and
piston drive means which moves back and forth the piston,
wherein a clearance portion, through which the molten resin is allowed to pass, is formed between the cylinder and the piston, and
wherein the apparatus is configured to:
move the piston backward by using the piston drive means when the molten resin flows into the cylinder from the plasticizing part;
reserve a predetermined amount of the molten resin into the cylinder gradually from the leading end portion of the cylinder; and
move the piston forwardly and inject the molten resin from the cylinder in the predetermined feed rate.

15. The apparatus for manufacturing molded products according to claim 13,
wherein a piston pushes and injects the molten resin in the predetermined feed rate.

16. The apparatus for manufacturing molded products according to claim 13, further comprising a valve in a connecting flow passage interposed between the plasticizing part and the resin storing cylinder, the valve opening and closing the connecting flow passage.

17. The apparatus for manufacturing molded products according to claim 13,
wherein the discharge port discharges the molten resin while moving in a state where the discharge port is supported by a highly rigid guide.

18. The apparatus for manufacturing molded products according to claim 17,
wherein the discharge port is supported on both sides thereof by at least one highly rigid guide located along the coating direction of the molten resin, and
wherein the highly rigid guide is fixed by two or more support members respectively located on the upstream and downstream sides of the coating direction of the molten resin.

19. The apparatus for manufacturing molded products according to claim 17,
wherein the discharge port is supported through a support member by a highly rigid guide located along the coating direction of the molten resin, and
wherein the highly rigid guide is fixed to the main body of the manufacturing apparatus with the resin coating device mounted thereon.

20. The apparatus for manufacturing molded products according to claim 9,
wherein the forming mold comprises an upper metal mold and a lower metal mold; and
wherein the apparatus further comprises moving means which moves a resin coated surface of the lower metal mold in a vertical direction.

21. The apparatus for manufacturing molded products according to claim 20,
wherein the moving means adjusts a distance between the distal end of the discharge port and the resin coated surface of the lower metal mold.

22. The apparatus for manufacturing molded products according to claim 20,
wherein the moving means is a platen of a pressing machine which mounts the lower metal mold thereon and presses against the upper and lower metal molds, and
wherein a distance between the discharge part and the resin coated surface of the lower metal mold is adjusted by a vertical movement of the platen.

23. The apparatus for manufacturing molded products according to claim 20,
wherein the moving means is a vertically moving stage which is interposed between the lower metal mold and a platen of a pressing machine and presses against the upper and lower metal molds, the platen mounting the lower metal mold thereon, and
wherein a distance between the discharge part and the resin coated surface of the lower metal mold is adjusted by the vertical movement of the vertically moving table.

24. The apparatus for manufacturing molded products according to claim 20,
wherein the moving means is means for moving only the resin coated surface of the lower metal mold in the vertical direction, and
wherein a distance between the distal end of the discharge port and the resin coated surface of the lower metal mold is adjusted by a vertical movement of the means.

25. A method for manufacturing a molded product, the method comprising:
providing a resin coating device comprising a discharge port configured to discharge molten thermoplastic resin;
providing a mold comprising minute indentations;
filling the mold with molten thermoplastic resin by discharging molten thermoplastic resin from the discharge port while moving the discharge port over the mold, wherein a discharge pressure of the resin coating device causes the molten thermoplastic resin to fill the minute uneven portion and pushes out air from between the molten thermoplastic resin and the minute uneven portion on the mold;
wherein a distance between a distal end of the resin coating device and the mold, as the resin coating device passes over the mold while discharging molten thermoplastic resin, is equal to a thickness of the molten thermoplastic resin that fills the mold; and
compressing the discharged molten thermoplastic resin against the mold thereby producing a shape of a final molded product, wherein the molten thermoplastic resin is compressed by a pressure no greater than 80 kg/cm².

26. The method according to claim 25 further comprising: heating the mold such that the thermoplastic resin adheres to the mold.

27. An apparatus for manufacturing a molded product, comprising:
a mold comprising at least one minute indentation;
a resin coating device configured to discharge a molten thermoplastic resin from a discharge port;
wherein the resin coating device is configured to move over the mold while molten thermoplastic resin is discharged from the discharge port so that the molten thermoplastic resin is filled into the minute uneven portion while a discharge pressure of the resin coating device pushes out air from between the molten thermoplastic resin and the minute uneven portion on the mold;
wherein a distance between a distal end of the resin coating device and the mold, as the resin coating device passes over the mold while discharging molten thermoplastic resin, is equal to a thickness of the molten thermoplastic resin that fills the mold; and
a pressing machine for compressing the molten resin on the metal mold, wherein the pressing machine is configured to compress the molten thermoplastic resin by a pressure no greater than 80 kg/cm².

28. The apparatus according to claim 27 further comprising:
heating means for heating the mold;
wherein the heating means is configured to heat the metal mold such that the molten thermoplastic resin adheres to the mold.

29. The method according to claim 1, wherein the distance between the distal end of the of the discharge port and the metal mold is set so that the distal end of the discharge port acts as a spatula to extend the molten thermoplastic resin onto the metal mold.

30. The method of manufacturing molded products according to claim 1, wherein the metal mold is heated to a temperature in the range of approximately 150° C. to 200° C.

31. The method of manufacturing molded products according to claim 30, wherein the molten thermoplastic resin that is poured into the metal mold has a temperature of approximately 240° C. or 250° C.

32. The apparatus for manufacturing molded products according to claim 9, wherein the heating means is configured to heat the metal mold to a temperature in a range of approximately 150° C. to 200° C.

33. The apparatus for manufacturing molded products according to claim 32, wherein the molten thermoplastic resin that is poured into the metal mold has a temperature of approximately 240° C. or 250° C.

34. The method of manufacturing molded products according to claim 25 further comprising heating the mold to a temperature in a range of approximately 150° C. to 200° C.

35. The method of manufacturing molded products according to claim 34, wherein the molten thermoplastic resin that is poured into the metal mold has a temperature of approximately 240° C. or 250° C.

36. The apparatus for manufacturing molded products according to claim 27 further comprising heating means for heating the mold, wherein the heating means is configured to heat the mold to a temperature in a range of approximately 150° C. to 200° C.

37. The apparatus for manufacturing molded products according to claim 36, wherein the molten thermoplastic resin that is poured into the metal mold has a temperature of approximately 240° C. or 250° C.

38. The method of manufacturing molded products according to claim 1, wherein the discharge port is provided with a front pouring gate and a back pouring gate, the front being an advancing direction of the discharge port.

39. The method of manufacturing molded products according to claim 1, wherein a front pouring gate and a back pouring gate maintains the discharge pressure of the molten resin as it is discharged from the discharge port.

40. A method for manufacturing molded products, comprising:
a resin coating step of coating a molten thermoplastic resin onto a metal mold having a minute uneven portion on a surface thereof;
a compressing step of compressing the coating of molten thermoplastic resin against the metal mold thereby producing a shape of a final molded product; and
a solidifying step of solidifying the coating of molten thermoplastic resin by cooling the coating of molten thermoplastic resin;
wherein the resin coating step further includes:
supplying the molten thermoplastic resin to a resin coating device including a discharge port;
discharging the molten thermoplastic resin onto the minute uneven portion from above while moving the resin coating device, wherein the distance between a distal end of the discharge port and the metal mold is equal to a thickness of the coating of the molten thermoplastic resin on the metal mold wherein a discharge pressure of the resin coating device causes the molten thermoplastic resin to fill the minute uneven portion and pushes out air from between the molten thermoplastic resin and minute uneven portion on the mold;
filling the molten thermoplastic resin into the minute uneven portion such that the thermoplastic resin has a shape and a thickness that is substantially the same as a shape and a thickness of the final molded product; and
heating the metal mold such that the thermoplastic resin is capable of adhering to the minute uneven portion;
wherein the metal mold is heated to a temperature in the range of approximately 150° C. to 200° C.

41. An apparatus for manufacturing molded products, comprising:
a metal mold which includes a minute uneven portion on a surface thereof;
heating means which heats the metal mold;
cooling means which cools the metal mold;
a resin coating device which fills a molten thermoplastic resin into the minute uneven portion;
wherein the resin coating device includes:
a plasticizing part which plasticizes a thermoplastic resin into a molten state;
a resin reserving part which reserves the molten thermoplastic resin therein; and
a discharge port which discharges the molten thermoplastic resin therefrom, and
wherein the resin coating device is movable in such a manner that the molten thermoplastic resin is discharged from the discharge port onto the minute uneven portion from above such that the molten thermoplastic resin has a shape and a thickness that is substantially the same as a shape and a thickness of a molded product wherein a discharge pressure of the resin coating device causes the molten thermoplastic resin to fill the minute uneven portion and pushes out air from between the molten thermoplastic resin and the minute uneven portion on the mold;

wherein the resin coating device is moveable such that a distance between a distal end of the discharge port and the metal mold is equal to a thickness of the molten thermoplastic resin after the molten thermoplastic resin is discharged onto the metal mold; and wherein the heating means is configured to heat the metal mold such that the thermoplastic resin is capable of adhesion to the minute uneven portion;

wherein the heating means is configured to heat the metal mold to a temperature in a range of approximately 150° C. to 200° C.

42. A method for manufacturing a molded product, the method comprising:

providing a resin coating device comprising a discharge port configured to discharge molten thermoplastic resin;

providing a mold comprising minute indentations;

filling the mold with molten thermoplastic resin by discharging molten thermoplastic resin from the discharge port while moving the discharge port over the mold wherein a discharge pressure of the resin coating device causes the molten thermoplastic resin to fill the minute uneven portion and pushes out air from between the molten thermoplastic resin and the minute uneven portion on the mold;

wherein a distance between a distal end of the resin coating device and the mold, as the resin coating device passes over the mold while discharging molten thermoplastic resin, is equal to a thickness of the molten thermoplastic resin that fills the mold;

heating the mold to a temperature in a range of approximately 150° C. to 200° C.

43. An apparatus for manufacturing a molded product, comprising:

a mold comprising at least one minute indentation;

a resin coating device configured to discharge a molten thermoplastic resin from a discharge port;

wherein the resin coating device is configured to move over the mold while molten thermoplastic resin is discharged from the discharge port wherein a discharge pressure of the resin coating device causes the molten thermoplastic resin to fill the minute uneven portion and pushes out air from between the molten thermoplastic resin and the minute uneven portion on the mold;

wherein a distance between a distal end of the resin coating device and the mold, as the resin coating device passes over the mold while discharging molten thermoplastic resin, is equal to a thickness of the molten thermoplastic resin that fills the mold; and heating means for heating the mold, wherein the heating means is configured to heat the mold to a temperature in a range of approximately 150° C. to 200° C.

44. The apparatus for manufacturing molded products according to claim 12, wherein the discharge port further includes a pouring gate on each of right and left sides in the resin coating device moving direction.

45. The method of manufacturing molded products according to claim 38, wherein the discharge port further includes a pouring gate on each of right and left sides in the advancing direction of the discharge port.

46. The method of manufacturing molded products according to claim 39, further comprising pouring gates on each of right and left sides, which maintain the discharge pressure of the molten resin as it is discharged from the discharge port.

* * * * *